(12) United States Patent
Kubo et al.

(10) Patent No.: US 10,203,028 B2
(45) Date of Patent: Feb. 12, 2019

(54) DRIVE GEAR UNIT

(71) Applicants: TOYOTA JIDOSHA KABUSHIKI KAISHA, Toyota-shi (JP); ALCHEMICA CORPORATION, Susono-shi (JP)

(72) Inventors: Aizoh Kubo, Kyoto (JP); Nobuyoshi Sugitani, Susono (JP)

(73) Assignees: TOYOTA JIDOSHA KABUSHIKI KAISHA, Toyota-shi (JP); ALCHEMICA CORPORATION, Susono-shi (JP)

( * ) Notice: Subject to any disclaimer, the term of this patent is extended or adjusted under 35 U.S.C. 154(b) by 454 days.

(21) Appl. No.: 14/905,567

(22) PCT Filed: Jul. 8, 2014

(86) PCT No.: PCT/JP2014/068161
§ 371 (c)(1),
(2) Date: Jan. 15, 2016

(87) PCT Pub. No.: WO2015/008661
PCT Pub. Date: Jan. 22, 2015

(65) Prior Publication Data
US 2016/0153537 A1   Jun. 2, 2016

(30) Foreign Application Priority Data

Jul. 16, 2013  (WO) .................. PCT/JP2013/069259

(51) Int. Cl.
*F16H 48/36* (2012.01)
*F16H 48/10* (2012.01)

(52) U.S. Cl.
CPC ............. *F16H 48/36* (2013.01); *F16H 48/10* (2013.01); *F16H 2048/364* (2013.01); *Y02T 10/7258* (2013.01)

(58) Field of Classification Search
CPC ........................... F16H 2048/364; F16H 48/36
See application file for complete search history.

(56) References Cited

U.S. PATENT DOCUMENTS 7,056,252 B2 * 6/2006 Gumpoltsberger .... B60K 17/16
475/150
9,120,479 B2 * 9/2015 Severinsson ............. B60K 1/02
(Continued)

FOREIGN PATENT DOCUMENTS

| JP | 39-1960 B1 | 2/1964 |
| JP | 2006-214530 A | 8/2006 |

(Continued)

OTHER PUBLICATIONS

International Search Report dated Aug. 12, 2014 for PCT/JP2014/068161 filed on Jul. 8, 2014.
(Continued)

*Primary Examiner* — Sherry L Estremsky
(74) *Attorney, Agent, or Firm* — Oblon, McClelland, Maier & Neustadt, L.L.P.

(57) ABSTRACT

The present invention provides a drive gear device that can easily be made compact and lightweight with a simple configuration, and that has little friction loss. Among externally toothed sun gear members (12a, 12b) and ring gear members (16, 17) of first and second planetary gear mechanisms (11a, 11b), one pair, which are first paired members (12a, 12b), are coupled to a coupling member (12) for equalizing the rotational speeds and rotational directions of the first paired members (12a, 12b), and the other pair, which are second paired members (16, 17) are coupled to opposite rotation members (18, 19) for making the second paired members (16, 17) rotate in opposite directions. Rotational torque inputted to the coupling member (12) is distributed to the first planetary gear mechanism (11a) and
(Continued)

the second planetary gear mechanism (11b), and is outputted from planetary carriers (15a, 15b).

5 Claims, 26 Drawing Sheets

(56) References Cited

U.S. PATENT DOCUMENTS

| | | | |
|---|---|---|---|
| 9,856,960 B2* | 1/2018 | Isono | F16H 48/34 |
| 2005/0070391 A1* | 3/2005 | Folsom | B60K 17/046 |
| | | | 475/23 |
| 2005/0124451 A1 | 6/2005 | Morikawa | |
| 2010/0323838 A1 | 12/2010 | Rosemeier et al. | |
| 2011/0245012 A1 | 10/2011 | Biermann et al. | |
| 2012/0083378 A1* | 4/2012 | Severinsson | F16H 48/30 |
| | | | 475/150 |
| 2017/0241532 A1* | 8/2017 | Isono | F16H 48/10 |

FOREIGN PATENT DOCUMENTS

| | | |
|---|---|---|
| JP | 2009-030626 A | 2/2009 |
| JP | 2010-190286 A | 9/2010 |
| JP | 2010-190287 A | 9/2010 |
| JP | 2010190287 A * | 9/2010 |

OTHER PUBLICATIONS

Extended European Search Report dated Nov. 7, 2016 in Patent Application No. 14826409.6.

* cited by examiner (a)

(b)

(a)

(b)

DRIVE GEAR UNIT

TECHNICAL FIELD

The present invention relates to a drive gear unit, and particularly to a drive gear unit adopted to transmit a rotary motion or a motive power (torque) in two paths.

BACKGROUND ART

Conventionally, various types of devices have been proposed which are used for control of a torque or rotational speed to be distributed to a drive wheel of an automobile.

For example, Patent Document 1 discloses a differential gear unit 510 as illustrated in a configuration diagram of FIG. 25. The differential gear unit 510 includes two sets of pinion gear units 520a and 520b, and sun gears as external gears 523a and 523b of the pinion gear units 520a and 520b and are connected to each other via an inner connection member 522. Outer connection members 527a and 527b are connected respectively to internal gears 526a and 526b of the pinion gear units 520a and 520b, and gears 528a and 528b meshed with a gear member 529 are formed at shaft-perpendicular end surfaces of the outer connection members 527a and 527b. When a driving force is input to the inner connection member 522, the driving force is output from the carriers 525a and 525b. It is possible to control distribution of the driving force and rotational speed by rotation or stop of the gear member 529.

Patent Document 2 discloses a spur gear differential unit as illustrated in a perspective view of FIG. 26. This spur gear differential unit includes first and second sun gears 603 and 605 and first and second pinion gears 607 and 609 which are engaged with each other. The first pinion gear 607 is engaged only with the first sun gear 603, and the second pinion gear 609 is engaged only with the second sun gear 605. The first and second sun gears 603 and 605 have the same number of teeth, and different addendum circle diameters. One of the first and second sun gears 603 and 605 is subjected to positive profile shifting, and the other is subjected to negative profile shifting.

Patent Document 3 discloses a transmission device illustrated in a configuration diagram of FIG. 27. This transmission device includes pinion gear sets 718 and 719, connected respectively to output shafts 716 and 717, and a shifting mechanism 722 between the output shafts 716 and 717. The shifting mechanism 722 can be switched between shift positions S1 and S2 so as to allow the right and left shafts to correspond to braking and driving by rotation in the same direction at the shift position S1 or to be reversely rotated at the shift position S2.

CITATION LIST

Patent Literature

Patent Document 1: JP 2006-214530 A
Patent Document 2: US 2011/0245012
Patent Document 3: US 2010/0323838

SUMMARY OF THE INVENTION

Problem to be Solved by the Invention

The differential gear unit 510 of FIG. 25 has the gear member 529 arranged in non-parallel with respect to central axes of the pinion gear units 520a and 520b, and thus, a structure thereof is complicated, manufacturing cost thereof increases, and further, a frictional loss is caused by the engagement between the gear member 529 and the gears 528a and 528b of the outer connection members 527a and 527b. In addition, the gear member 529 is arranged in a radial direction with respect to the central axes of the pinion gear units 520a and 520b, and a torsional torque acts on the outer connection members 527a and 527b, and thus, it is difficult to reduce a size and weight thereof.

The spur gear differential unit of FIG. 26 is a stepped pinion gear unit to operate as a simple differential gear which allows a rotational difference between right and left wheels of a vehicle. Accordingly, there is a need for rotating a carrier that rotatably supports the first pinion gear 607 and the second pinion gear 609 in order to change torque distribution or cause a difference in the rotational speed. In such a case, a configuration for the rotation of the carrier becomes complicated and large, and further the frictional loss is also caused.

A transmission unit of FIG. 27 is configured to be bilaterally asymmetrical and complicated with first and second pinion gear sets 718 and 719 having different configurations, and thus, the frictional loss is large.

The present invention has been made in view of such circumstances, and aims to provide a drive gear unit which allows easy reduction in size and weight with a simple configuration, and has a small frictional loss.

Solution to Problem

The present invention provides a drive gear unit configured as follows in order to solve the problems described above.

A drive gear unit includes: (a) a housing; (b) first and second pinion gear units each of which includes a sun gear as an external gear in which an external sun gear is formed, a pinion gear in which a pinion gear to be engaged with the external sun gear is formed, an internal gear in which inner teeth to be engaged with the pinion gear are formed, and a carrier which supports the pinion gear while allowing to rotate and revolve around the external sun gear, and in which the sun gear as external gear, the internal gear and the carrier are rotatable; (c) a connection member to which any one first pair between the sun gears as external gears of the first and second pinion gear units and the internal gears of the first and second pinion gear units is fixed and which causes each rotational speed and each rotation direction of the first pair to be the same; and (d) a reverse rotation member to which another second pair between the sun gears as external gears of the first and second pinion gear units and the internal gears of the first and second pinion gear units is fixed and which causes each rotation direction of the second pair to reverse each other. A rotational torque input to the connection member is distributed into the first pinion gear unit and the second pinion gear unit, and is output from the carrier.

In the above-described configuration, the internal gears of the first and second pinion gear units rotate in the reverse directions by the reverse rotation member in a case in which the sun gears as external gears of the first and second pinion gear units are engaged with the connection member, and thus, it is possible to evenly distribute a rotational torque input to the connection member into the carriers of the first and second pinion gear units. Since the sun gears as external gears of the first and second pinion gear units rotate in the reverse directions in the case of the internal gears of the first and second pinion gear units are connected to the connection member, it is possible to evenly distribute the rotational torque input to the connection member into the carriers of the first and second pinion gear units.

According to the above-described configuration, the reverse rotation member does not transmit a driving force input to the connection member. In addition, there is no need of revolving the reverse rotation member. Thus, the drive gear unit can be simply configured, and easily reduced in size, and has a small frictional loss caused in the drive gear unit.

Preferably, the drive gear unit further includes a control motor which rotates at least one of the second member of the first pinion gear unit, and the second member of the second pinion gear unit and the reverse rotation member.

In this case, it is possible to rotate second members of the first and second pinion gear units in the reverse directions using the control motor, and control a difference in a rotational torque or rotational speed to be distributed to the carriers of the first and second pinion gear units. Since the part rotated to transmit the rotational torque and the part rotated by the control motor to distribute the rotational torque and control the difference in the rotational speed are completely separated from each other, the controllability is extremely favorable. Further, in a case in which an electrical system that drives the control motor or a unit that transmits the rotation of the control motor malfunctions, only the second members of the first and second pinion gear units are not rotated in the reverse directions, and the rotational torque is evenly distributed into the carriers of the first and second pinion gear units by the reverse rotation member, and the distribution of the rotational torque is hardly in an abnormal state. Thus, the unit is stable even when there is failure, and a mechanical operation of distributing the rotational torque is maintained.

Preferably, the connection member is connected coaxially with the sun gears as external gears of the first and second pinion gear units which are the first pair. Outer teeth are formed in the internal gears of the first and second pinion gear units. The drive gear unit further includes: (a) a first auxiliary gear pair which has first outer teeth and second outer teeth to be engaged with the outer teeth of the internal gear of the first pinion gear unit coaxially formed, and is rotatably supported by the housing; and (b) a second auxiliary gear pair which has third outer teeth to be engaged with the second outer teeth of the first auxiliary gear pair and fourth outer teeth to be engaged with the outer teeth of the internal gear of the second pinion gear unit coaxially formed, and is rotatably supported by the housing. The first and second auxiliary gear pairs function as the reverse rotation members.

In this case, the driving force is not transmitted to the first and second gears of the first and second auxiliary gear pairs and the frictional loss is small when the first and second auxiliary gear pairs are arranged in parallel to the rotation center axes of the sun gear as external gear of the first and second pinion gear units. In addition, there is no need that the first and second auxiliary gear pairs revolve around the internal gears of the first and second pinion gear units. Thus, the drive gear unit can be simply configured, and easily reduced in size.

Preferably, outer teeth are formed in the internal gear of the first pinion gear unit. The drive gear unit further includes: (a) a dual concentric motor which includes an inner rotor arranged between the first pinion gear unit and the second pinion gear unit with both ends protruding to the first pinion gear unit side and the second pinion gear unit side and an outer rotor with both ends protruding the first pinion gear unit side and the second pinion gear unit side, and in which the sun gears as external gears of the first and second pinion gear units are connected coaxially at the both ends of the inner rotor and the second pinion gear unit side of the outer rotor is connected coaxially to the internal gear of the second pinion gear unit; (b) a third auxiliary gear pair which is connected coaxially to the first pinion gear unit side of the outer rotor and has inner teeth; and (c) a fourth auxiliary gear pair in which first outer teeth to be engaged with the outer teeth of the internal gear of the first pinion gear unit and second outer teeth to be engaged with the inner teeth of the third auxiliary gear pair are coaxially formed, and which is rotatably supported by the housing. The inner rotor of the dual concentric motor functions as the connection member. The outer rotor of the dual concentric motor and the third and fourth auxiliary gear pair function as the reverse rotation members. The dual concentric motor functions as the control motor and as a drive motor that drives the connection member to rotate.

In this case, it is possible to easily reduce the size and weight of the drive gear unit.

Preferably, outer teeth are formed in the internal gear of the first pinion gear unit. The drive gear unit further includes: (a) a fifth auxiliary gear pair which is connected coaxially to the first pinion gear unit side of the internal gear of the second pinion gear unit, and has inner teeth; (b) a sixth auxiliary gear pair in which first outer teeth to be engaged with the outer teeth of the internal gear of the first pinion gear unit and the second outer teeth to be engaged with the inner teeth of the fifth auxiliary gear pair are formed coaxially, and which is rotatably supported by the housing; and (c) a drive motor which is arranged between the first pinion gear unit and the second pinion gear unit and has an inner rotor with both ends protruding the first pinion gear unit side and the second pinion gear unit side, and in which the sun gears as external gears of the first and second pinion gear units are connected coaxially to the both ends of the inner rotor. The first pair is the sun gears as external gears of the first and second pinion gear units. The inner rotor of the drive motor functions as the connection member. The fifth and sixth auxiliary gear pairs functions as the reverse rotation members.

In this case, it is possible to simplify the configuration by reducing the engagement points between the reverse rotation members. In addition, it is possible to decrease a dimension in the radial direction.

Preferably, the connection member is connected coaxially with the sun gears as external gears of the first and second pinion gear units which are the first pair. Outer teeth are formed in the internal gears of the first and second pinion gear units. The drive gear unit further includes a reversing motor that has first and second output shafts, which are arranged coaxially, protrude to sides opposite to each other, and are driven to rotate in reverse directions, and in which first and the second external gears to be engaged with the outer teeth of the internal gears of the first and second pinion gear units are connected coaxially to the first and second output shafts. The reversing motor functions as the reverse rotation member and the control motor.

In this case, the assembly of the reverse rotation member becomes easy.

Preferably, the connection member is connected coaxially with the sun gears as external gears of the first and second pinion gear units which are the first pair. The inner teeth of the internal gear of the first pinion gear unit includes an inner teeth extension portion which is extended to the second pinion gear unit side. The inner teeth of the internal gear of the second pinion gear unit includes the inner teeth extension portion which is extended to the first pinion gear unit side. The drive gear unit further includes: (a) a first auxiliary gear pair which has a first gear and a second gear to be engaged with the inner teeth extension portion of the internal gear of the first pinion gear unit being formed coaxially, and is rotatably supported by the housing; and (b) a second auxiliary gear pair which has a third gear to be engaged with the second outer teeth of the first auxiliary gear pair and a fourth gear to be engaged with the inner teeth extension portion of the internal gear of the second pinion gear unit being formed coaxially, and is rotatably supported by the housing. The first and second auxiliary gear pairs function as the reverse rotation members.

In this case, it is possible to connect the internal gears of the first and second pinion gear units so as to rotate in the reverse directions without forming the outer teeth in the internal gears of the first and second pinion gear units.

Preferably, the connection member is connected coaxially with the sun gears as external gears of the first and second pinion gear units which are the first pair. The drive gear unit further includes an intermediate gear which is fixed to the connection member, and has outer teeth formed coaxially with the sun gears as external gears of the first and second pinion gear units.

In this case, it is possible to input the driving force from a drive source arranged at outside of the drive gear unit to the intermediate gear, and distribute the output into the carriers of the first and second pinion gear units.

Preferably, the first pair is the internal gears of the first and second pinion gear units. The drive gear unit further includes a reversing motor that has first and second output shafts, which are arranged between the first and second pinion gear units, protrude to sides opposite to each other coaxially and are driven to rotate in reverse directions, and in which the sun gears of the first and second pinion gear units are connected coaxially to the first and second output shafts. The reversing motor functions as the reverse rotation member and the control motor.

In this case, the assembly of the reverse rotation member and the control motor becomes easy.

Effects of the Invention

The drive gear unit of the present invention allows easy reduction in size and weight with the simple configuration, and has the small frictional loss.

DESCRIPTION OF EMBODIMENTS

Hereinafter, embodiments of the present invention will be described with reference to FIGS. 1 to 24.

<First Embodiment> A drive gear unit 10 of a first embodiment will be described with reference to FIGS. 1 to 6(b).

Figure 1:
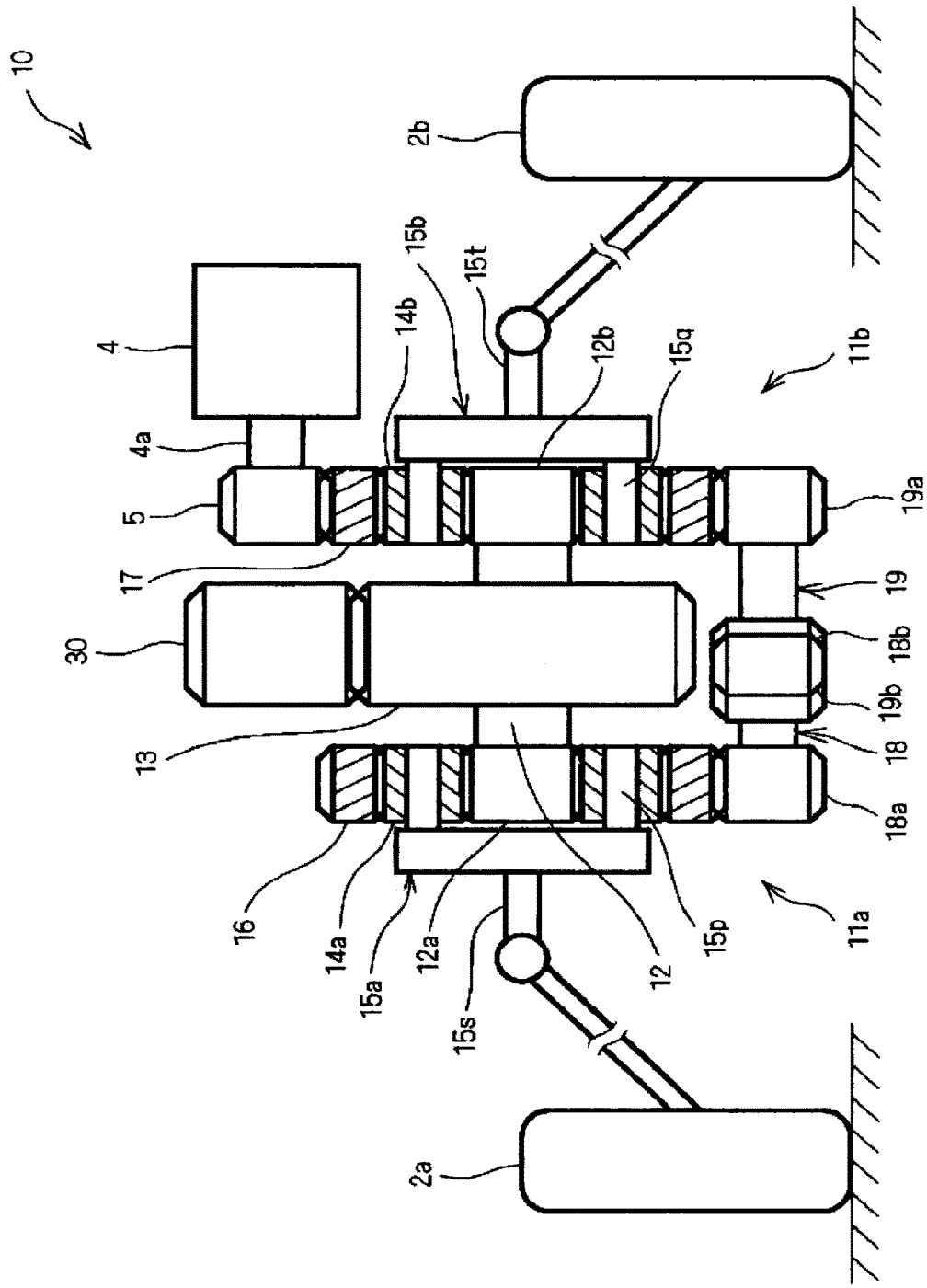
FIG. 1 is a configuration diagram of a drive gear unit (First Embodiment).

FIG. 1 is an explanatory diagram schematically illustrating a configuration of the drive gear unit 10 by exemplifying drive of an automobile. FIGS. 2(a) to 5(c) are perspective views illustrating engagement of gears of the drive gear unit 10. Incidentally, although a spur gear is illustrated in order to allow easy understanding of the configuration of the present invention, a gear is not limited to the spur gear, and various types of gears such as a helical gear, a double helical gear, a bevel gear and a conical gear may be selected as appropriate.

Figure 2:
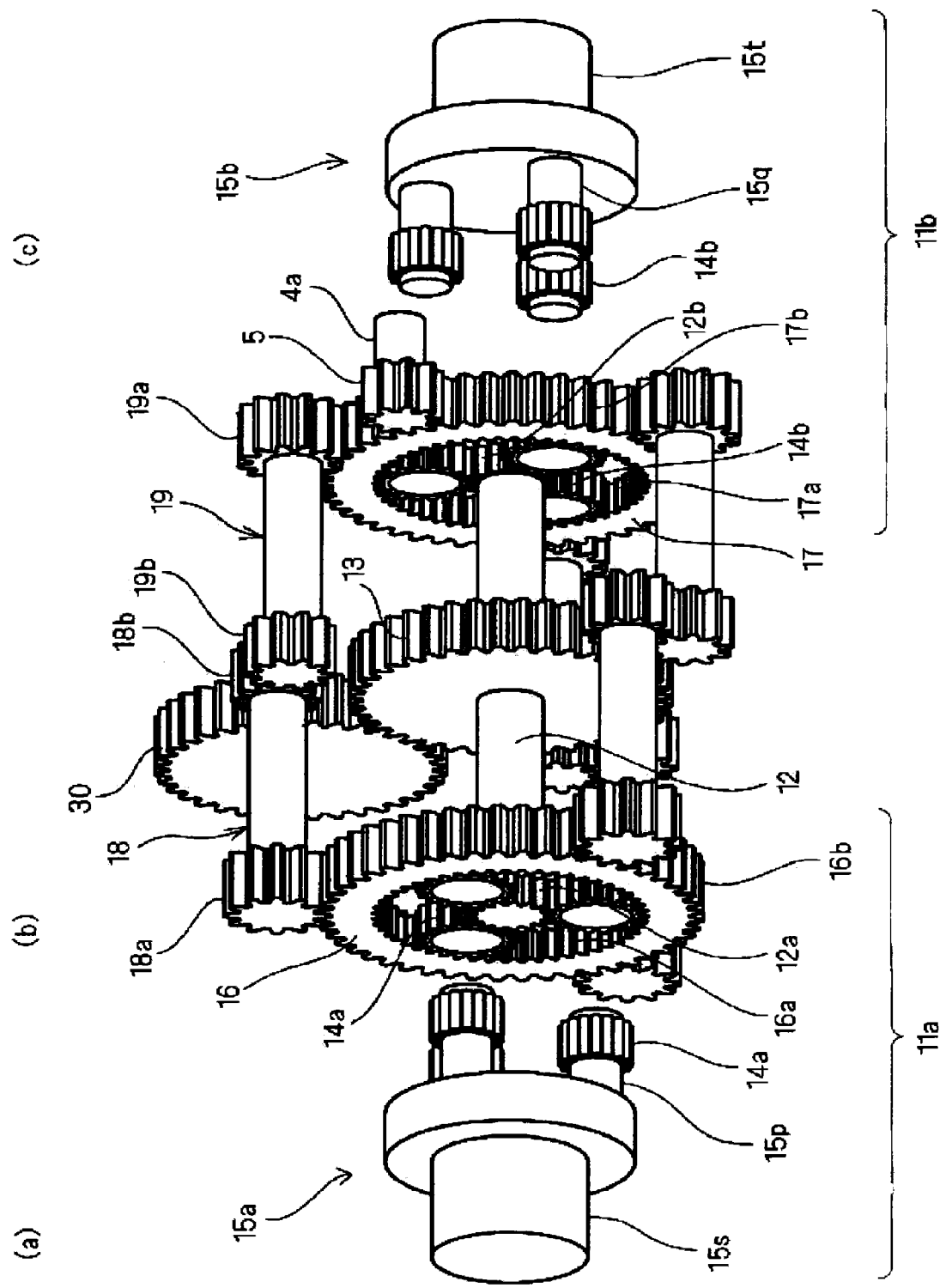
FIGS. 2(a) to 2(c) are perspective views illustrating engagement of gears of the drive gear unit (First Embodiment).

As illustrated in FIGS. 1 to 2(c), the drive gear unit 10 includes first and second pinion gear units 11a and 11b, a connection shaft 12, and first and second auxiliary gear pairs 18 and 19.

As illustrated in FIGS. 1 and 2(b), the first and second pinion gear units 11a and 11b includes (i) sun gears as external gears 12a and 12b in which external sun gears are formed, (ii) a plurality of pinion gears 14a and 14b in which pinion gears to be engaged with the external sun gears are formed, (iii) internal gears 16 and 17 in which inner teeth 16a and 17a to be engaged with the pinion gears are formed, and outer teeth 16b and 17b are formed on outer circumferential surfaces at radially outer sides than the inner teeth 16a and 17a, and (iv) carriers 15a and 15b that supports the pinion gears 14a and 14b to be rotatable and revolvable. As illustrated in FIGS. 2(a) and 2(c), the pinion gears 14a and 14b are rotatably supported by support shafts 15p and 15q of the carriers 15a and 15b, and each rotation of central shafts 15s and 15t of the carriers 15a and 15b is transmitted to each of right and left wheels 2a and 2b. The internal gears 16 and 17 of the first and second pinion gear units 11a and 11b are rotatably supported by a housing (not illustrated) of the drive gear unit 10, and positions of rotation center axes of the internal gears 16 and 17 of the first and second pinion gear units 11a and 11b are fixed with respect to the housing (not illustrated) of the drive gear unit 10. Each of the sun gears as external gears 12a and 12b, the internal gears 16 and 17, and the carriers 15a and 15b of the first and second pinion gear units 11a and 11b is rotatable.

Figure 3:
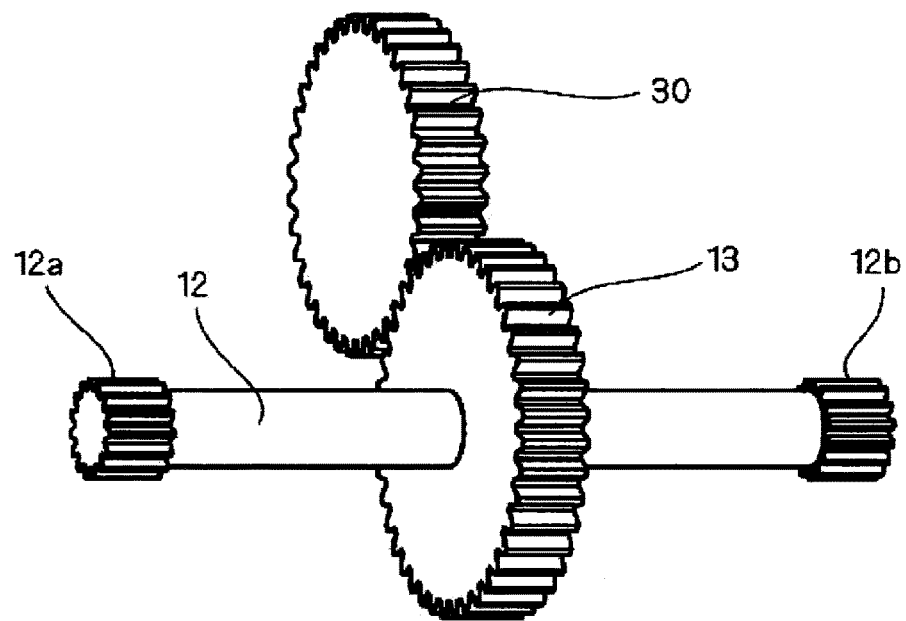
FIG. 3 is a perspective view illustrating engagement of the gears of the drive gear unit (First Embodiment).

As illustrated in FIG. 3, the sun gears as external gears 12a and 12b of the first and second pinion gear units 11a and 11b are fixed coaxially to the connection shaft 12. In addition, an intermediate gear 13, in which outer teeth to be engaged with an input gear 30 are formed, is fixed coaxially to the connection shaft 12 between the sun gears as external gears 12a and 12b. The connection shaft 12 is a connection member.

It is preferable that an addendum circle diameter of the intermediate gear 13 fixed to the connection shaft 12 be smaller than each addendum circle diameter of the outer teeth 16b and 17b of the internal gears 16 and 17 of the first and second pinion gear units 11a and 11b. In this case, the intermediate gear 13 does not protrude, and thus, it is easy to configure the intermediate gear 13 not to interfere with the first and second auxiliary gear pairs 18 and 19, and accordingly, it is possible to reduce a size of the drive gear unit 10. In addition, it is possible to configure a drive source and the drive gear unit to be compact by bringing the rotation center axis of the input gear 30, to be connected to the drive source, close to the drive gear unit.

Figure 4:
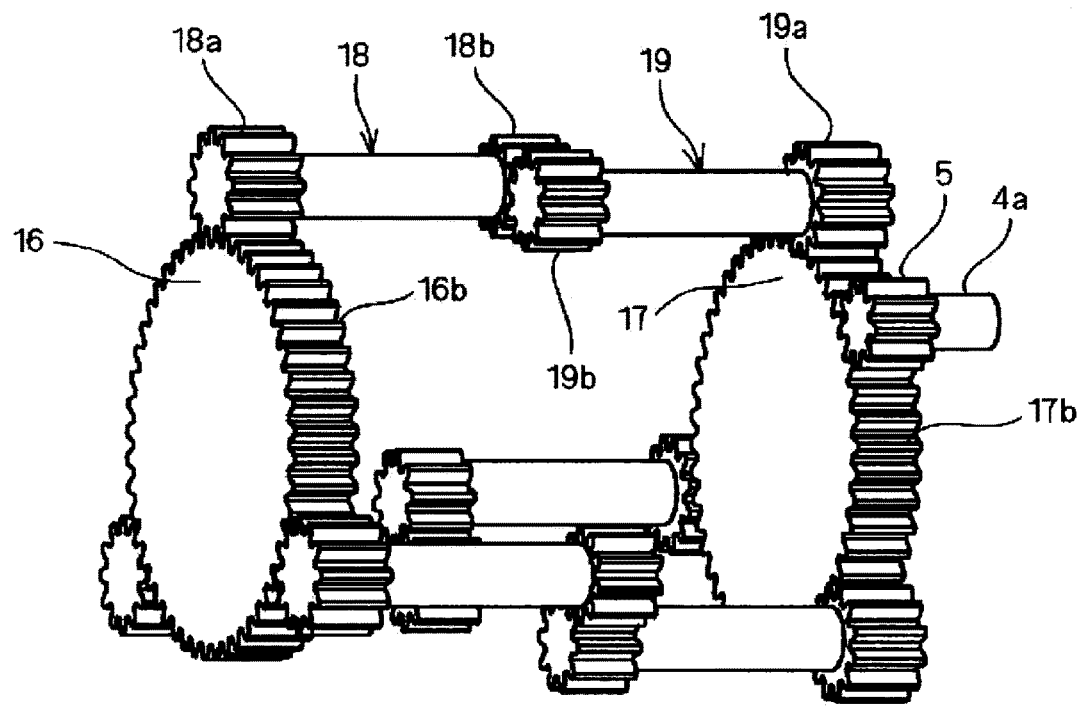
FIG. 4 is a perspective view illustrating engagement of the gears of the drive gear unit (First Embodiment).
Figure 5:
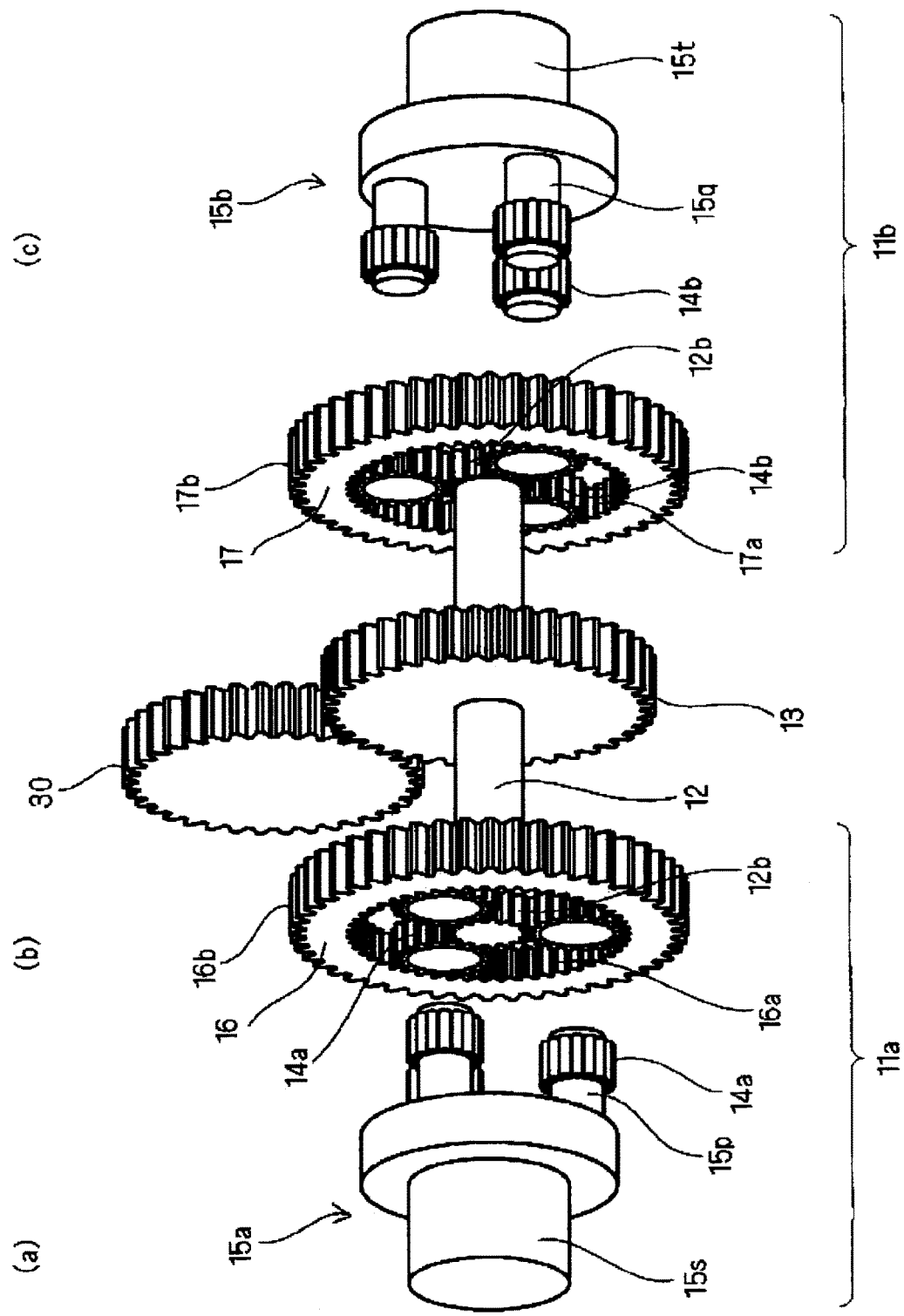
FIGS. 5(a) to 5(c) are perspective views illustrating engagement of the gears of the drive gear unit (First Embodiment).

As illustrated in FIG. 4, a plurality of sets, for example, three sets of the first and second auxiliary gear pairs 18 and 19 are arranged at outer sides of the internal gears 16 and 17 of the first and second pinion gear units 11a and 11b to be rotatable and parallel with the rotation center axis of the sun gears as external gears 12a and 12b of the first and second pinion gear units 11a and 11b. The first auxiliary gear pair 18 includes a first gear 18a and a third gear 18b to be engaged with the outer teeth 16b of the internal gear 16 of the first pinion gear unit 11a, and the first and third gear 18a and 18b are arranged coaxially. The second auxiliary gear pair 19 includes a second gear 19a and a fourth gear 19b to be engaged with the outer teeth 17b of the internal gear 17 of the second pinion gear unit 11b, and the second and fourth gears 19a and 19b are arranged coaxially. The third gear 18b of the first auxiliary gear pair 18 and the fourth gear 19b of the second auxiliary gear pair 19 are engaged with each other. Incidentally, the inner teeth 16a and 17a of the internal gears 16 and 17 of the first and second pinion gear units 11a and 11b are not illustrated in FIG. 4. The first and second auxiliary gear pairs 18 and 19 are rotatably supported by the housing (not illustrated) of the drive gear unit 10, and positions of the rotation center axes of the first and second auxiliary gear pairs 18 and 19 are fixed with respect to the housing (not illustrated) of the drive gear unit 10.

Further, a control gear 5 fixed to a rotary shaft 4a of a control motor 4 is arranged at an outer side of the internal gear 17 of the second pinion gear unit 11b. Outer teeth to be engaged with the outer teeth 17b of the internal gear 17 of the second pinion gear unit 11b are formed in the control gear 5. The control gear 5 can be arranged to be engaged with any one of the first and second gears 18a and 19a of the first and second auxiliary gear pairs 18 and 19, or arranged to be engaged with any one of the third and fourth gears 18b and 19b of the first and second auxiliary gear pairs 18 and 19.

Although not illustrated, the connection shaft 12, the central shafts 15s and 15t of the carriers 15a and 15b, and the first and second auxiliary gear pairs 18 and 19 are rotatably supported to a casing, for example, via a bearing, and the control motor 4 is fixed to the casing.

Next, an operation of the drive gear unit 10 will be described.

As illustrated in the perspective views of FIGS. 5(a) to 5(c), when a rotational torque is transmitted from the input gear 30 to the intermediate gear 13 in a case in which the first and second auxiliary gear pairs 18 and 19 and the control gear 5 are not provided, rotational torques Ta and Tb are distributed respectively to the central shafts 15s and 15t of the carriers 15a and 15b of the first and second pinion gear units 11a and 11b. At this time, forces Fa and Fb proportional to the rotational torques Ta and Tb act in the same direction on the outer teeth 16b and 17b of the internal gears 16 and 17 of the first and second pinion gear units 11a and 11b.

When the first and second gears 18a and 19a of the first and second auxiliary gear pairs 18 and 19 are engaged with the outer teeth 16b and 17b of the internal gears 16 and 17 of the first and second pinion gear units 11a and 11b, the forces Fa and Fb are transmitted from the outer teeth 16b and 17b of the internal gears 16 and 17 of the first and second pinion gear units 11a and 11b to the first and second gears 18b and 19b of the first and second auxiliary gear pairs 18 and 19. When the third and fourth gears 18b and 19b of the first and second auxiliary gear pairs 18 and 19 are engaged with each other, the rotational torques Ta and Tb are equal, and the forces Fa and Fb are balanced via the first and second auxiliary gear pairs 18 and 19 in the case of Fa=Fb, and the distribution of the rotational torques Ta and Tb is maintained. On the other hand, when there is a difference in rotational speed between the carriers 15a and 15b, the difference in the rotational speed is transmitted from the outer teeth 16b and 17b of the internal gears 16 and 17 of the first and second pinion gear units 11a and 11b, that is, from one of the first and second auxiliary gear pairs 18 and 19 to the other, and the distribution of the rotational torques Ta and Tb does not changed without any difference between the forces Fa and Fb so that the rotational torques Ta and Tb are evenly distributed.

In other words, the drive gear unit 10 includes the first and second auxiliary gear pairs 18 and 19, and thus, can allow the rotational energy to be evenly distributed to the central shafts 15s and 15t of the carriers 15a and 15b of the first and second pinion gear units 11a and 11b.

Further, when a rotational torque Tc is added from the control gear 5 fixed to the rotary shaft 4a of the control motor 4, the rotational torques Ta and Tb output from the central shafts 15s and 15t of the carriers 15a and 15b of the first and second pinion gear units 11a and 11b are distributed such that a torque corresponding to the rotational torque Tc is added to any one thereof, and is subtracted from the other one. Thus, it is possible to control the difference between the rotational torques Ta and Tb by adjusting the rotational torque Tc to be applied from the control gear 5.

In other words, the drive gear unit 10 includes the control gear 5 in addition to the first and second auxiliary gear pairs 18 and 19, and thus, it is possible to control the distribution of the rotational energy with respect to the central shafts 15s and 15t of the carriers 15a and 15b of the first and second pinion gear units 11a and 11b by the control gear 5.

In this manner, the drive gear unit 10 can cause the rotational torques output from the central shafts 15s and 15t of the carriers 15a and 15b of the first and second pinion gear units 11a and 11b to be even, or control the difference between the rotational torques, and thus, can be used as the differential that distributes the rotational torque into right and left, and front and rear wheels.

Figure 6:
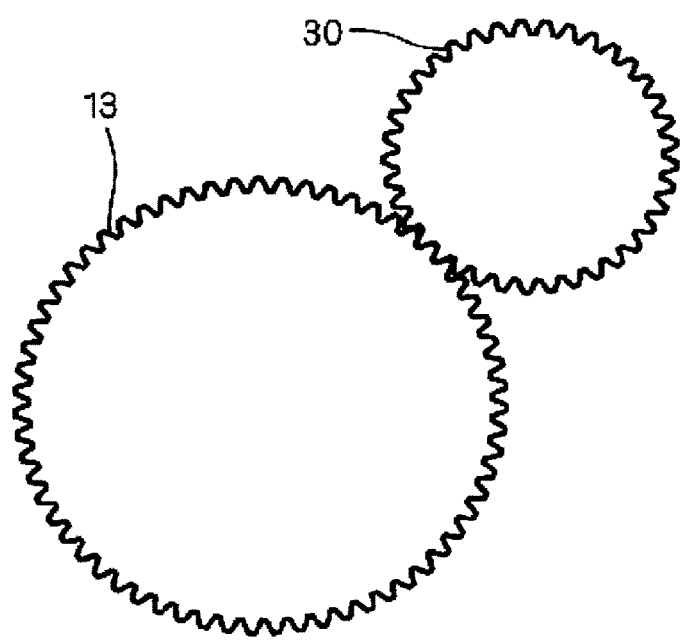
FIGS. 6(a) and 6(b) are plan views illustrating engagement of the gears of the drive gear unit (First Embodiment).
Figure 6:
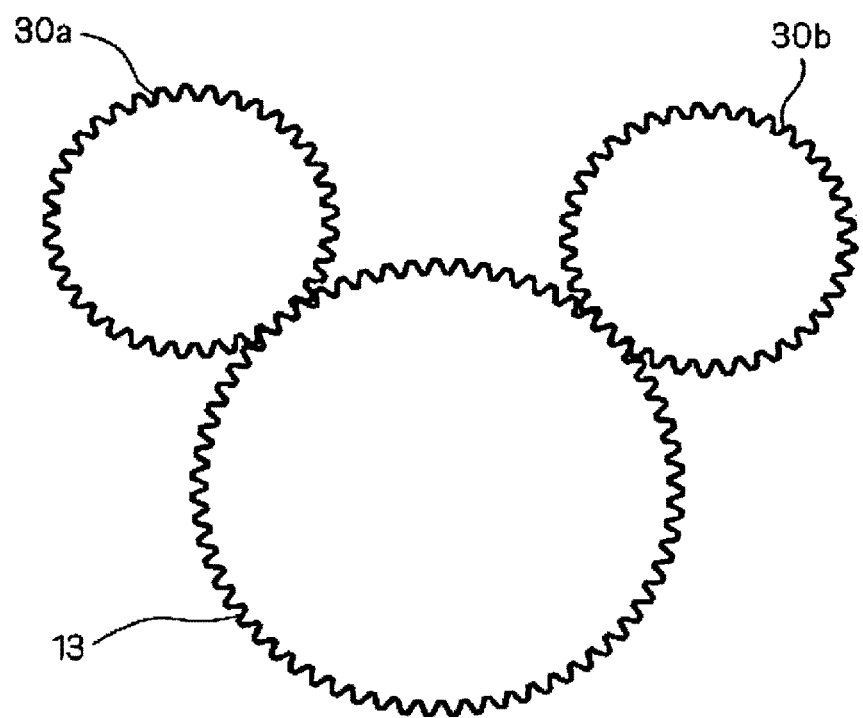

For example, it is configured such that the single input gear 30, which transmits the driving force of an engine, is engaged with the intermediate gear 13 as illustrated in FIG. 6(*a*) in order to distribute a driving torque to the right and left wheels of an engine car. In the case of a hybrid type, it is configured such that an input gear 30a for driving the engine and an input gear 30b for driving a motor are engaged with the intermediate gear 13 as illustrated in FIG. 6(*b*). Examples of the number of teeth of each gear in such cases are shown in the following Table 1.

TABLE 1

|  | Sun gear | Planetary | Inner teeth | Reduction ratio |
| --- | --- | --- | --- | --- |
| Number of teeth | 20 | 16 | 52 | 3.6 |

|  | Drive input | Intermediate | Reduction ratio |
| --- | --- | --- | --- |
|  | 48 | 12 | 4 |
|  | 40 | 20 | 2 |

The drive gear unit 10 can obtain an excellent action and effect as follows.

Since the first and second auxiliary gear pairs 18 and 19 are arranged at the outer sides of the internal gears 16 and 17 of the first and second pinion gear units 11a and 11b, a force to act corresponding to the rotational torque decreases. Further, since the plurality of sets of the first and second auxiliary gear pairs 18 and 19 are arranged, the force that acts corresponding to the rotational torque can be shared among the respective sets. Thus, it is easy to secure strength for the gears of the first and second auxiliary gear pairs 18 and 19. In addition, gear shafts inside the drive gear unit 10 are not misaligned due to the rotational torque.

In addition, the first and second auxiliary gear pairs 18 and 19 are rotatably supported by the casing or the like, similar to the connection shaft 12 and the central shafts 15s and 15t of the carriers 15a and 15b to simply rotate, and do not revolve around the internal gears 16 and 17 of the first and second pinion gear units 11a and 11b like the pinion gear. Furthermore, the first and second auxiliary gear pairs 18 and 19 are rotated only by the difference in the rotational speed between the central shafts 15s and 15t of the carriers 15a and 15b of the first and second pinion gear units 11a and 11b, that is, the difference in the rotational speed between the wheels 2a and 2b, and thus, each rotational speed thereof is low.

From such points, the first and second auxiliary gear pairs 18 and 19 can be configured to be small.

In addition, the first and second auxiliary gear pairs 18 and 19 and the rotation center axis of the control gear 5 are arranged in parallel with the rotation center axis of the first and third pinion gear units 11a and 11b, and do not change in the axial direction in the drive gear unit 10. Thus, it is possible to arrange the first and second auxiliary gear pairs 18 and 19 to be around the internal gears 16 and 17 of the first and third pinion gear units 11a and 11b.

Further, the first and second auxiliary gear pairs 18 and 19 and the rotation center axis of the control gear 5 are arranged in parallel with the rotation center axes of the first and third pinion gear units 11a and 11b and the rotary shafts thereof do not intersect each other. Thus, it is possible to manufacture the drive gear unit 10 with high performance and low cost using an existing technique, and further, a frictional loss of engagement is few.

Accordingly, it is possible to allow the drive gear unit 10 to have a compact configuration, be reduced in size and weight, and be manufactured with high performance and low cost.

The drive gear unit 10 can be formed to be bilaterally asymmetrical, and thus, it is easy to secure straight driving when being used in the automobile.

In the drive gear unit 10, the rotation for transmitting the rotational torque and the rotation for controlling the distribution of the rotational torque are completely separated. Since the total sum of the rotational torques output from the central shafts 15s and 15t of the carriers 15a and 15b of the first and second pinion gear units 11a and 11b does not change even when the control motor 4 is driven, the control motor 4 does not exert any influence on the rotation of the drive source such as the motor or the engine. Even when the rotation of the driving force generated by the drive source such as the motor or the engine is changed, there is no influence on the control of the difference in the rotational torque between the central shafts 15s and 15t of the carriers 15a and 15b of the first and second pinion gear units 11a and 11b. Thus, the drive gear unit 10 allows an extremely favorable controllability with respect to the distribution of the rotational torque and the difference in the rotational speed.

In addition, in a case in which the control motor 4 does not operate due to disconnection or the like, a function of equally distributing the rotational torque is maintained when the rotary shaft 4a of the control motor 4 freely rotates without any resistance. In a case in which the rotation of the rotary shaft 4a of the control motor 4 becomes a load, a difference of the rotational torque with respect to the load is caused, but the own function of distributing the rotational torque is maintained. In addition, the rotational torque to be distributed is restricted by such a load, and thus, it is expected to serve as a limited slip differential in which a control unit such as a friction brake or a viscous resistance is incorporated in an output shaft. In other words, the drive gear unit 10 is stable even in a case in which the control gear 5 does not function due to failure of the control motor 4, and maintains the mechanical operation to distribute the rotational torque.

<Second Embodiment> A drive gear unit 10a of a second embodiment will be described with reference to FIGS. 7 to 8(*b*). The drive gear unit 10a of the second embodiment is configured in substantially the same manner as the drive gear unit 10 of the first embodiment. Hereinafter, the same reference numeral will be used for the same configuration part as the first embodiment, and a description will be given focusing on a different point from the first embodiment.

Figure 7:
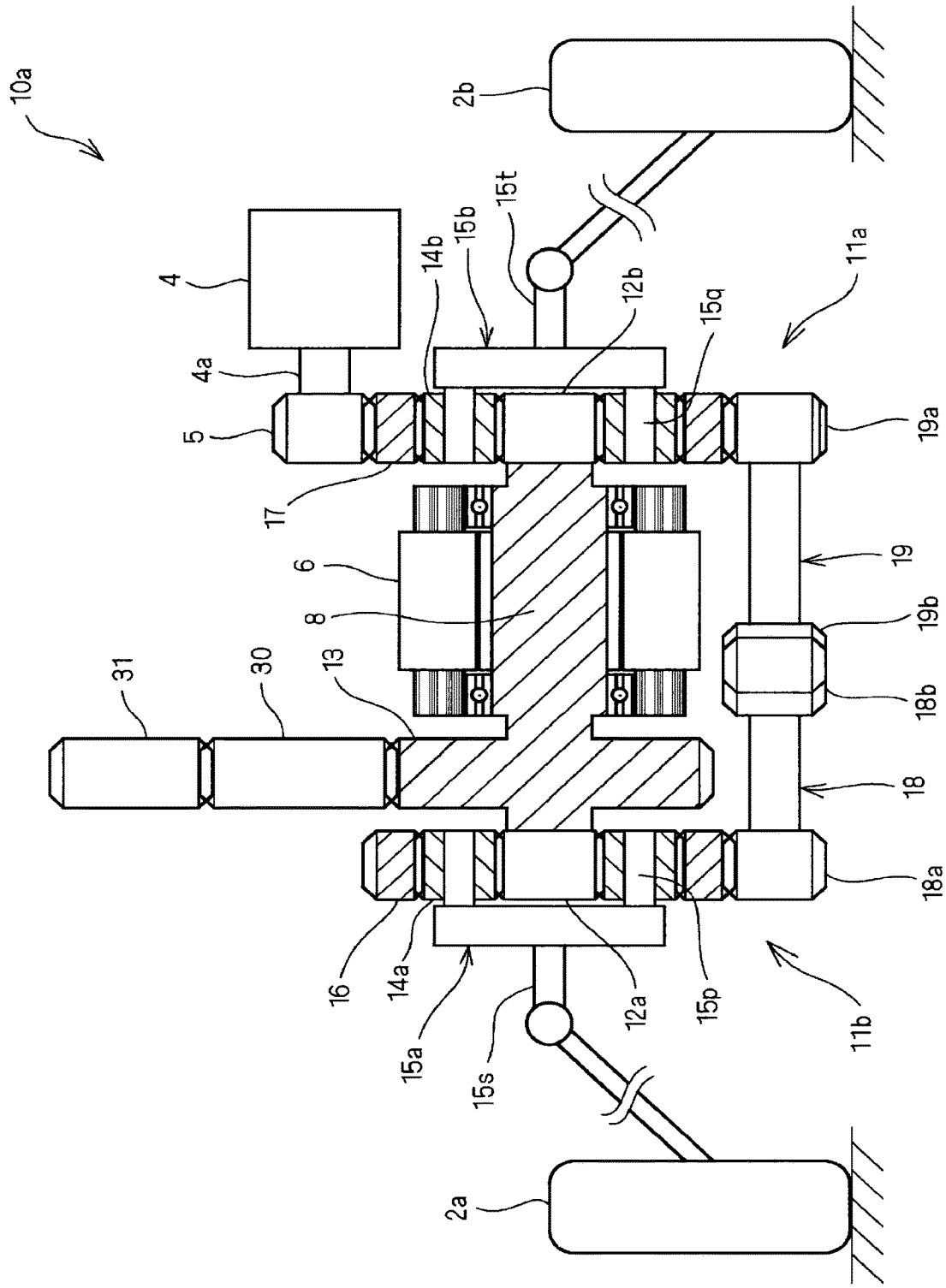
FIG. 7 is a configuration diagram of a drive gear unit (Second Embodiment).
Figure 8:
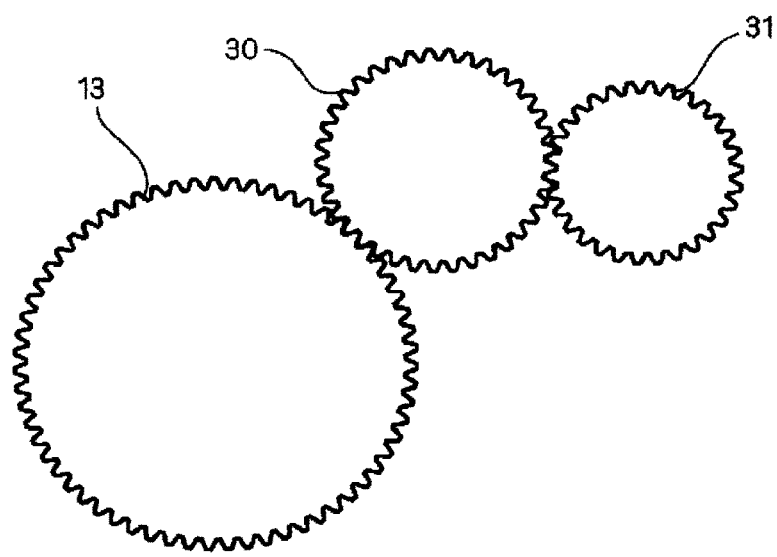
FIGS. 8(a) and 8(b) are plan views of engagement of gears of the drive gear unit (Second Embodiment).
Figure 8:
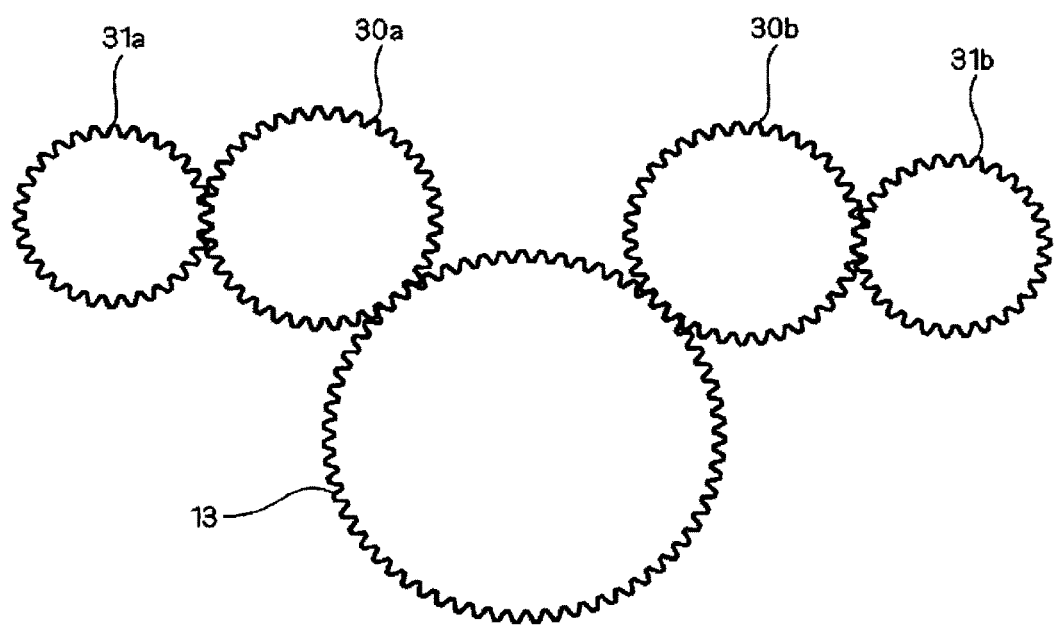

As illustrated in FIG. 7, the drive gear unit 10a of the second embodiment includes the sun gears as external gears 12a and 12b of the first and second pinion gear units 11a and 11*b*, the first and second auxiliary gear pairs 18 and 19, and the control gear 5, similar to the drive gear unit 10 of the first embodiment.

The drive gear unit 10*a* of the second embodiment is different from the drive gear unit 10 of the first embodiment in terms of a configuration between the first and second pinion gear units 11*a* and 11*b*. In other words, an electric motor 6 having a rotary shaft 8 protruding at both ends thereof is arranged between the first and second pinion gear units 11*a* and 11*b*, and the sun gears as external gears 12*a* and 12*b* of the first and second pinion gear units 11*a* and 11*b* are fixed to both ends of the rotary shaft 8. That is, the rotary shaft 8 of the electric motor 6 is a modification of the connection shaft 12 of the drive gear unit 10 of the first embodiment. In addition, the intermediate gear 13 is fixed to one side of the rotary shaft 8.

In addition, a transmission gear 31 to be engaged with the input gear 30 is rotated by the drive source, which is different from the drive gear unit 10 of the first embodiment. A set of the input gear 30 and the transmission gear 31 may be provided as illustrated in FIG. 8(*a*), or two or more sets of the input gears 30*a* and 30*b* and transmission gears 31*a* and 31*b* may be provided as illustrated in FIG. 8(*b*). It may be configured such that the transmission gear 31 is discarded as in the first embodiment, and a function thereof is realized by the input gear 30, or that the intermediate gear 13 and the input gear 30 are non-parallel axes gears if dimensionally configurable.

Similar to the drive gear unit 10 of the first embodiment, the drive gear unit 10*a* can distribute the rotational torque to be output to the central shafts 15*s* and 15*t* of the carriers 15*a* and 15*b* of the first and second pinion gear units 11*a* and 11*b*, or control the a difference in the distribution of the rotational torque.

A drive system is configured in an integrated manner by combining the electric motor, a deceleration unit, and the differential by incorporating the electric motor 6 in the drive gear unit 10*a* the electric motor 6, and the drive gear unit 10*a* reduced in size is particularly suitable for the automobile driven by the motor. In other words, the pinion gear unit has the largest reduction ratio in a case in which the external sun gear is input, the carrier is output. Since a general automobile proceeds about 1.8 m to 2 m by a single rotation of a tire, and vehicle speed is about 160 Km/h, the output number of revolutions required for the carrier is about 1200 to 1500 rpm. The most efficient rotational speed for the motor is 5,000 rpm to 10,000 rpm. A reduction gear ratio of the pinion gear unit having the external sun gear as input and the carrier as output is generally about 3 to 8, and thus, it is possible to rotate the tire at the most efficient rotational speed of the motor. Accordingly, the drive gear unit 10*a* can realize a configuration of a motor drive system which is the most logical, and suitable for requests of vehicles.

Figure 9:
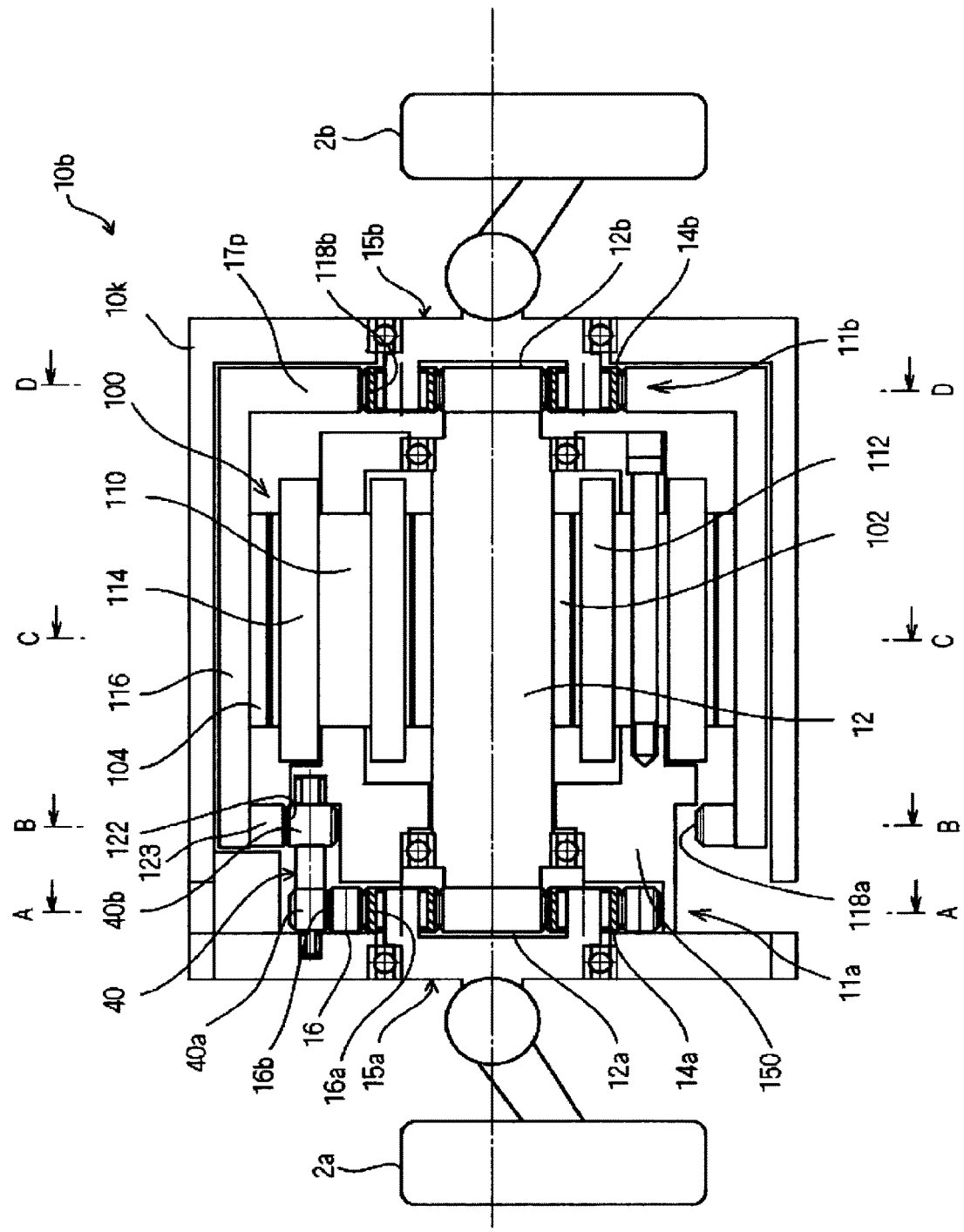
FIG. 9 is a configuration diagram of a main section of a drive gear unit (Third Embodiment).
Figure 10:
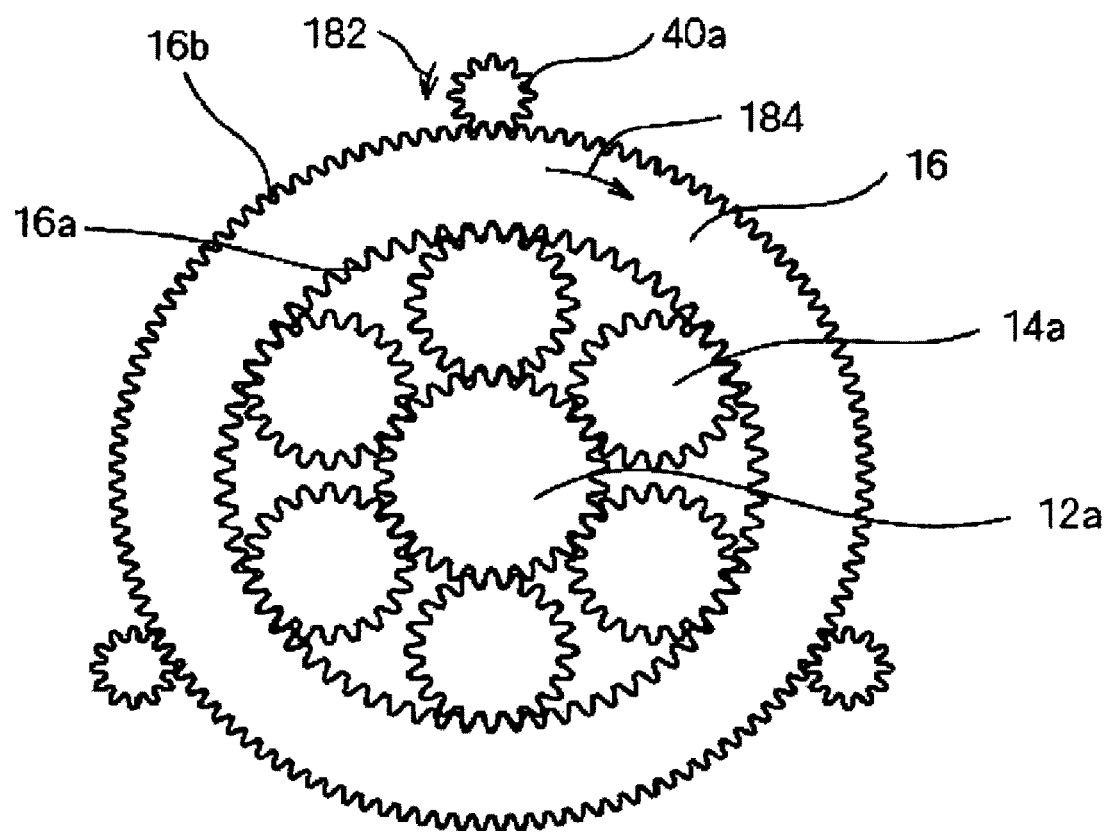
FIG. 10 is a cross-sectional view of the drive gear unit (Third Embodiment).
Figure 11:
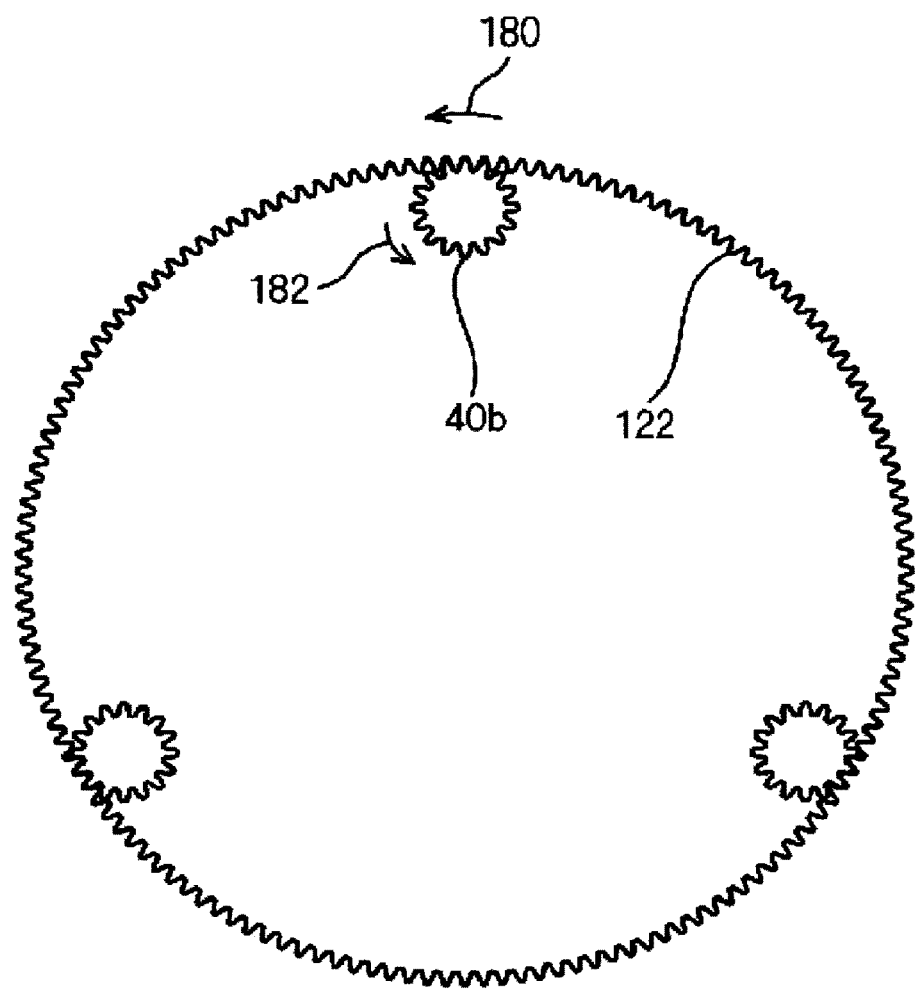
FIG. 11 is a cross-sectional view of the drive gear unit (Third Embodiment).
Figure 12:
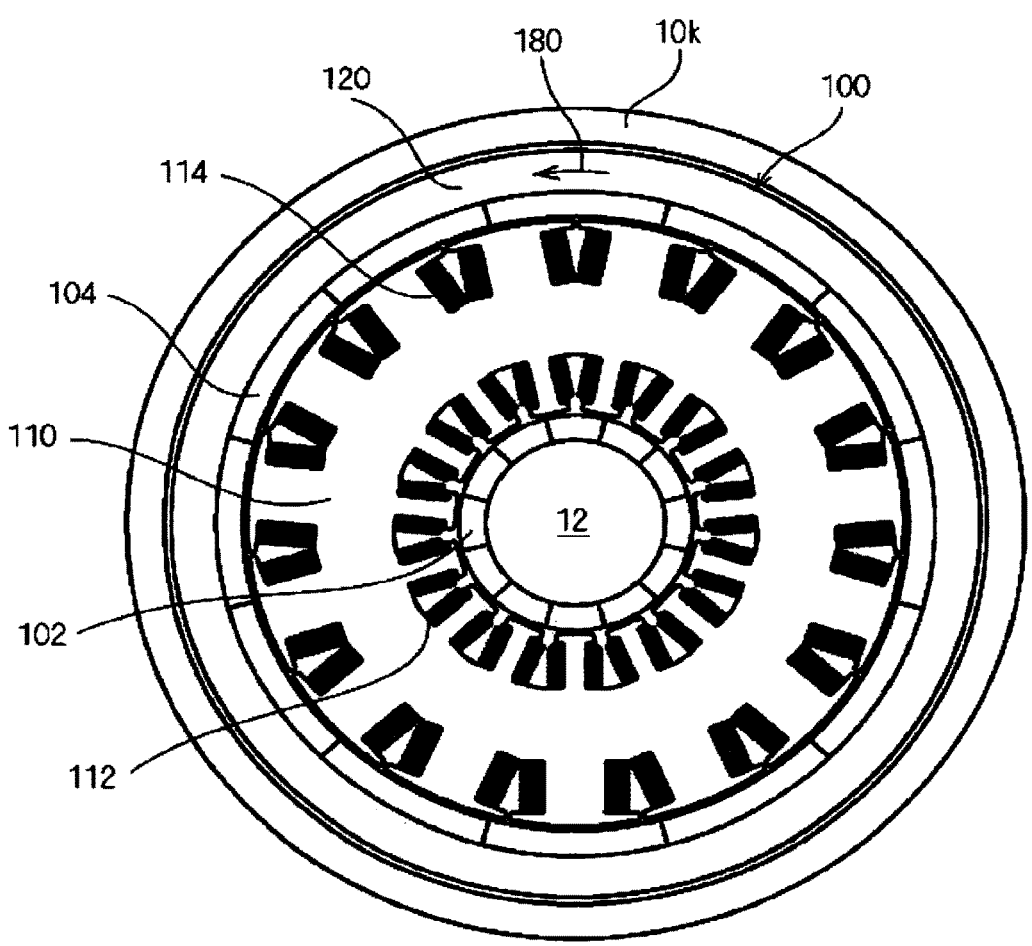
FIG. 12 is a cross-sectional view of the drive gear unit (Third Embodiment).
Figure 13:
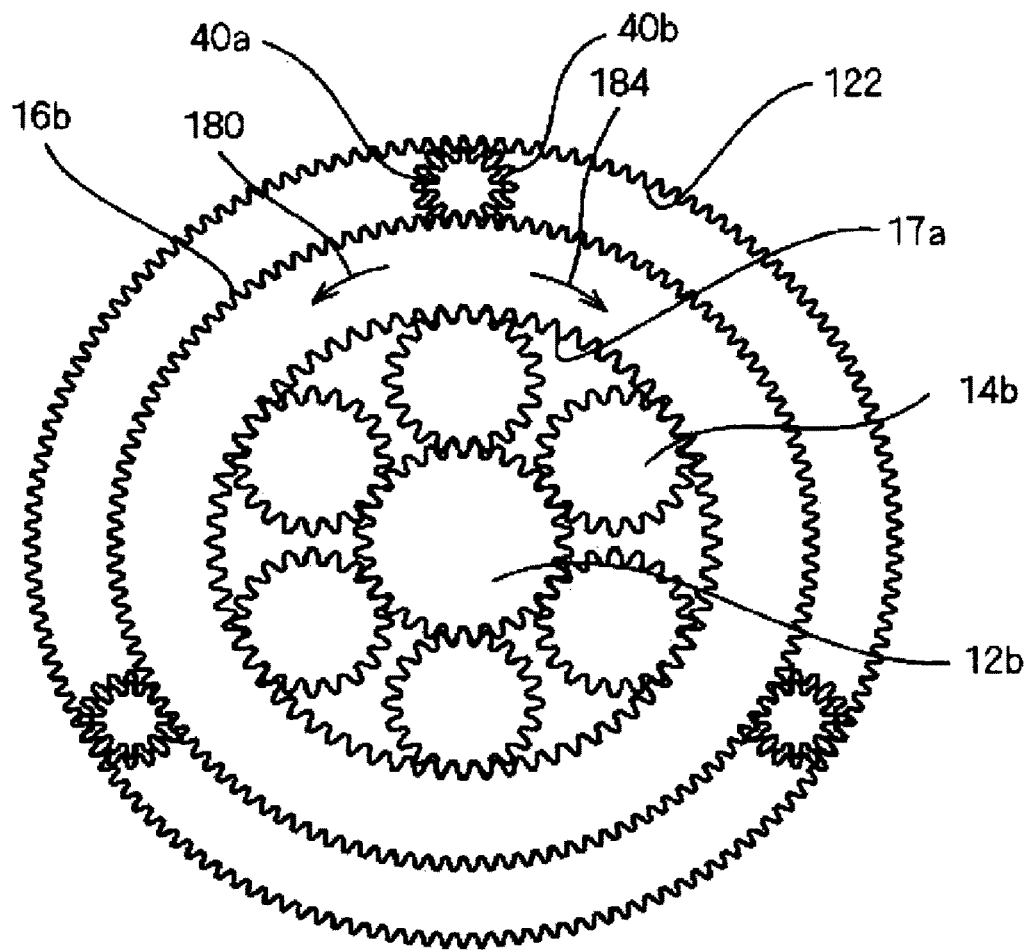
FIG. 13 is a transparent view of gears of the drive gear unit (Third Embodiment).

<Third Embodiment> A drive gear unit 10*b* of a third embodiment will be described with reference to FIGS. 9 to 13. FIG. 9 is a configuration diagram of a main section of the drive gear unit 10*b*. FIG. 10 is a cross-sectional view taken along line A-A of FIG. 9. FIG. 11 is a cross-sectional view taken along line B-B of FIG. 9. FIG. 12 is a cross-sectional view taken along line C-C of FIG. 9. FIG. 13 is a transparent view of the gears taken along line D-D of FIG. 9.

As illustrated in FIG. 9, the drive gear unit 10*b* is configured in substantially the same manner as that of the first embodiment. The drive gear unit 10*b* includes a dual concentric motor 100 arranged between the first and second pinion gear units 11*a* and 11*b*, a third auxiliary gear pair 123, and a fourth auxiliary gear pair 40 rotatably supported by a housing 10*k* of the drive gear unit 10*b*, which is different from the first embodiment. In addition, outer teeth are not formed in an internal gear 17*p* of the second pinion gear unit 11*b*.

As illustrated in FIG. 12, the dual concentric motor 100 has two motors which are concentrically configured. In other words, an inner rotor to which a magnet 102 is fixed, that is, the connection shaft 12 is arranged at an inner side of a stator 110, and an outer rotor 116 to which a magnet 104 is fixed is arranged at an outer side of the stator 110. Coils 112 and 114 are provided in the stator 110 to oppose the magnets 102 and 104, respectively. The stator 110 is fixed to a housing 10*k* of the drive gear unit 10*b* via a support member 150.

As illustrated in FIG. 9, the sun gears as external gears 12*a* and 12*b* of the first and second pinion gear units 11*a* and 11*b* are connected coaxially at both ends of the inner rotor of the dual concentric motor 100, that is, the connection shaft 12 and rotate in an integrated manner. In other words, the inner rotor of the dual concentric motor 100, that is, the connection shaft 12 functions as the connection member.

As illustrated in FIG. 9, the third auxiliary gear pair 123 having inner teeth 122 is connected coaxially at the first pinion gear unit 11*a* side of the outer rotor 116 of the dual concentric motor 100, and the third auxiliary gear pair 123 and the outer rotor 116 rotate in an integrated manner. The second pinion gear unit 11*b* of the outer rotor 116 of the dual concentric motor 100 is connected coaxially to the internal gear 17*p* of the second pinion gear unit 11*b*, and the outer rotor 116 and the internal gear 17*p* rotate in an integrated manner.

As illustrated in FIGS. 9 and 10, the outer teeth 16*b* are formed in the internal gear 16 of the first pinion gear unit 11*a* concentrically with the inner teeth 16*a*.

As illustrated in FIGS. 9 to 11, first and second gears 40*a* and 40*b* are formed coaxially at both sides of the fourth auxiliary gear pair 40, first outer teeth 40*a* are engaged with the outer teeth 16*b* of the internal gear 16 of the first pinion gear unit 11*a*, and second gear 40*b* are engaged with the inner teeth 122 of the third auxiliary gear pair 123.

When the outer rotor 116 of the dual concentric motor 100 rotates in a direction indicated by an arrow 180 in FIG. 12, for example, in a state in which the sun gears as external gears 12*a* and 12*b* of the first and second pinion gear units 11*a* and 11*b* and the carriers 15*a* and 15*b* are stationary, the second gear 40*b* of the fourth auxiliary gear pair 40 rotates in a direction indicated by an arrow 182 as illustrated in FIG. 11. Further, as illustrated in FIG. 10, the first external gear 40*a* of the fourth auxiliary gear pair 40 rotates in the direction indicated by the arrow 182, and the internal gear 16 of the first pinion gear unit 11*a* rotates in a direction indicated by an arrow 184. Meanwhile, the internal gear 17*p* of the second pinion gear unit 11*b* rotates in the same direction as the outer rotor 116 of the dual concentric motor 100, that is, the direction indicated by the arrow 180 as illustrated in FIG. 13. Accordingly, the internal gears 16 and 17*p* of the first and second pinion gear units 11*a* and 11*b* rotate in the reverse directions, via the outer rotor 116 and the fourth auxiliary gear pair 40. The outer rotor 116 of the dual concentric motor 100, and the third and fourth auxiliary gear pairs 123 and 40 function as reverse rotation members.

When the internal gears 16 and 17*p* of the first and second pinion gear units 11*a* and 11*b* rotate at the same rotational speed in the reverse directions, it becomes easy to control the torque distribution. An exemplary design to obtain such an effect is as follows.

The number of teeth of the outer teeth 16*b* of the internal gear 16 of the first pinion gear unit 11*a*:120

The number of teeth of the first gear 40a of the fourth auxiliary gear pair 40:12

The number of teeth of the second gear 40b of the fourth auxiliary gear pair 40:16

The number of teeth of the inner teeth 122 of the third auxiliary gear pair 123:160

The number of arrangement of the fourth auxiliary gear pair 40:3

When the inner rotor of the dual concentric motor 100, that is, the connection shaft 12 rotates, a driving force (rotational torque) thereof is transmitted to the carriers 15a and 15b of the first and second pinion gear units 11a and 11b as similar to the first embodiment. At this time, when the outer rotor 116 of the dual concentric motor 100 is rotated, the torque distribution is changed. The drive gear unit 10b can control the driving by the inner rotor of the dual concentric motor 100, and control the differential by the outer rotor, and thus, it is possible to perform the control of the driving force and the control of the torque distribution in an independent manner.

The drive gear unit 10b uses the inner rotor of the dual concentric motor 100 for the driving, and uses the outer rotor of the dual concentric motor 100 for the control of the torque distribution. On the contrary, it is also possible to use the outer rotor of the dual concentric motor 100 for the driving, and the inner rotor for the control of the torque distribution, but it is possible to reduce the size and weight of the drive gear unit when using the inner rotor with not only a small size but also high output for the driving.

It is easy to configure the drive gear unit 10b to have a small dimension in the axial direction, and be compact without any opening at an outer circumference thereof. In addition, the reverse rotation members are engaged at two points to be smaller than the three points of the first embodiment, and the outer rotor 116 of the drive motor 100 also serves as the reverse rotation member. Accordingly, it is possible to easily reduce the size and weight.

<Fourth Embodiment> A drive gear unit 10c of a fourth embodiment will be described with reference to FIG. 14.

Figure 14:
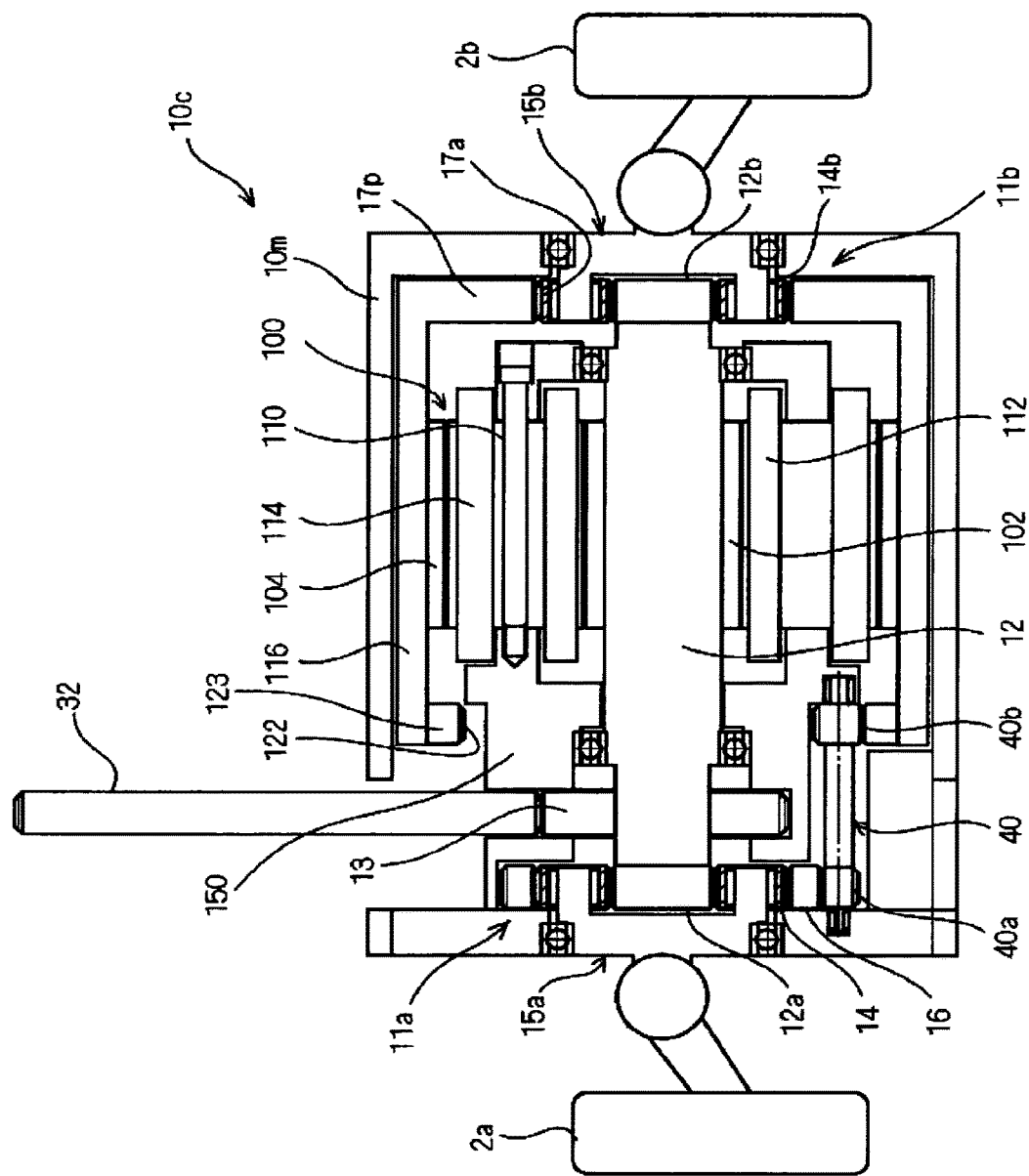
FIG. 14 is a configuration diagram of a main section of a drive gear unit (Fourth Embodiment).

FIG. 14 is a configuration diagram of a main section of the drive gear unit 10c. As illustrated in FIG. 14, the drive gear unit 10c has the intermediate gear 13 in addition to the drive gear unit 10b of the third embodiment. The intermediate gear 13 is fixed to the connection shaft 12. The intermediate gear 13 is engaged with a transmission gear 32. The intermediate gear 13 transmits a driving force via the transmission gear 32 from an outer side of a housing 10m of the drive gear unit 10c. When the drive gear unit 10c of the fourth embodiment is used in, for example, a hybrid car, the driving force of the engine is input to the intermediate gear 13.

<Fifth Embodiment> A drive gear unit 10d of a fifth embodiment will be described with reference to FIG. 15.

Figure 15:
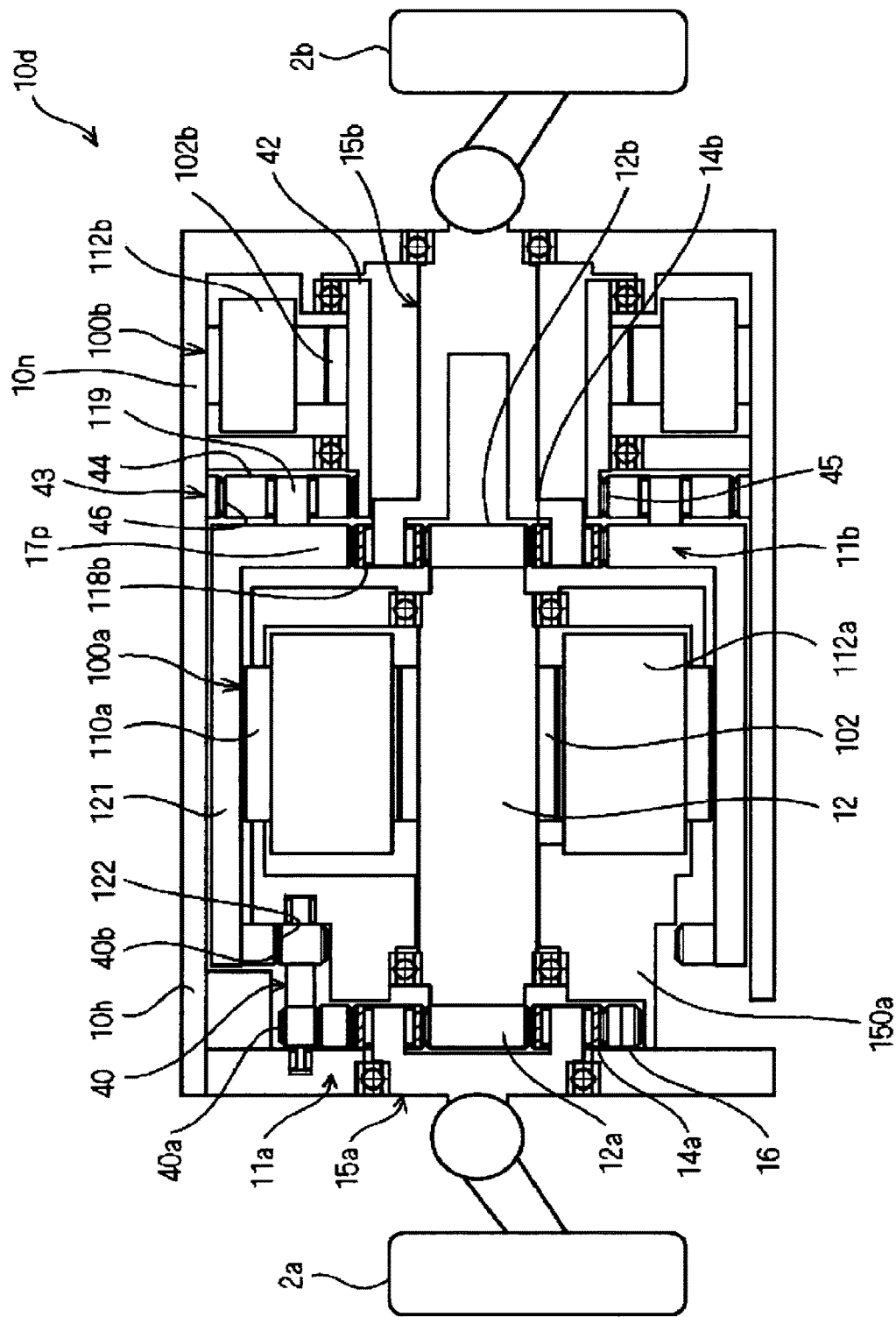
FIG. 15 is a configuration diagram of a main section of a drive gear unit (Fifth Embodiment).

FIG. 15 is a configuration diagram of a main section of the drive gear unit 10d. As illustrated in FIG. 15, the drive gear unit 10d is arranged such that a drive motor 100a that drives the connection shaft 12 to rotate and a control motor 100b that drives the internal gear 17p of the second pinion gear unit 11b to rotate are arranged side by side in the axial direction.

In the drive motor 100a, a stator 110a surrounds the connection shaft 12 to which the magnet 102 is fixed, and a coil 112a is provided in the stator 110a. The stator 110a is fixed to a housing 10n of the drive gear unit 10d via a support member 150a.

The internal gear 16 of the first pinion gear unit 11a and the internal gear 17p of the second pinion gear unit 11b are connected to each other so as to rotate in the reverse directions via a fifth auxiliary gear pair 121 and a sixth auxiliary gear pair 40 as substantially similar to the third embodiment.

In other words, the fifth auxiliary gear pair 121 is a member that corresponds to the outer rotor 116 and the third auxiliary gear pair 123 of the drive motor 100 of the third embodiment, is connected coaxially to the internal gear 17 of the second pinion gear unit 11b, and has inner teeth 122 at the first pinion gear unit 11a side. The sixth auxiliary gear pair 40 is rotatably supported by the housing 10m of the drive gear unit 10d, and has the first and second gears 40a and 40b formed coaxially at both sides thereof. The first gear 40a of the sixth auxiliary gear pair 40 is engaged with the outer teeth 16b of the internal gear 16 of the first pinion gear unit 11a, and the second gear 40b is engaged with the inner teeth 122 of the fifth auxiliary gear pair 121. Accordingly, the internal gear 16 of the first pinion gear unit 11a and the internal gear 17p of the second pinion gear unit 11b rotate in the reverse directions as similar to the third embodiment. The fifth and sixth auxiliary gear pairs 123 and 40 functions as the reverse rotation members.

Rotation of an output shaft 42 of the control motor 100b is transmitted to the internal gear 17 of the second pinion gear unit 11b via a planetary mechanism 43. In other words, the external sun gear 45 of the planetary mechanism 43 is formed in the output shaft 42 of the control motor 100b. An inner gear 46 of the planetary mechanism 43 is fixed to the housing 10m of the drive gear unit 10d. A planetary shaft 119 that rotatably supports a pinion gear 44 of the planetary mechanism 43 is fixed to the internal gear 17 of the second pinion gear unit 11b. Accordingly, the rotation of the output shaft 42 of the control motor 100b is transmitted to the internal gear 17 of the second pinion gear unit 11b via the planetary mechanism 43.

When the drive motor 100a rotates, a driving force (rotational torque) thereof is transmitted to the carriers 15a and 15b of the first and second pinion gear units 11a and 11b. At this time, when the control motor 100b is rotated, the torque distribution is changed. The drive gear unit 10c can control the driving by the drive motor 100a, and control the differential by the control motor 100b, and thus, it is possible to perform the control of the driving force and the control of the torque distribution in an independent manner.

It is possible to simplify the configuration of the drive gear unit 10d by reducing the engagement points between the reverse rotation members as similar to the drive gear unit 10b of the third embodiment. In addition, it is possible to decrease a dimension in the radial direction.

<Sixth Embodiment> A drive gear unit 10e of a sixth embodiment will be described with reference to FIGS. 16 and 17.

Figure 16:
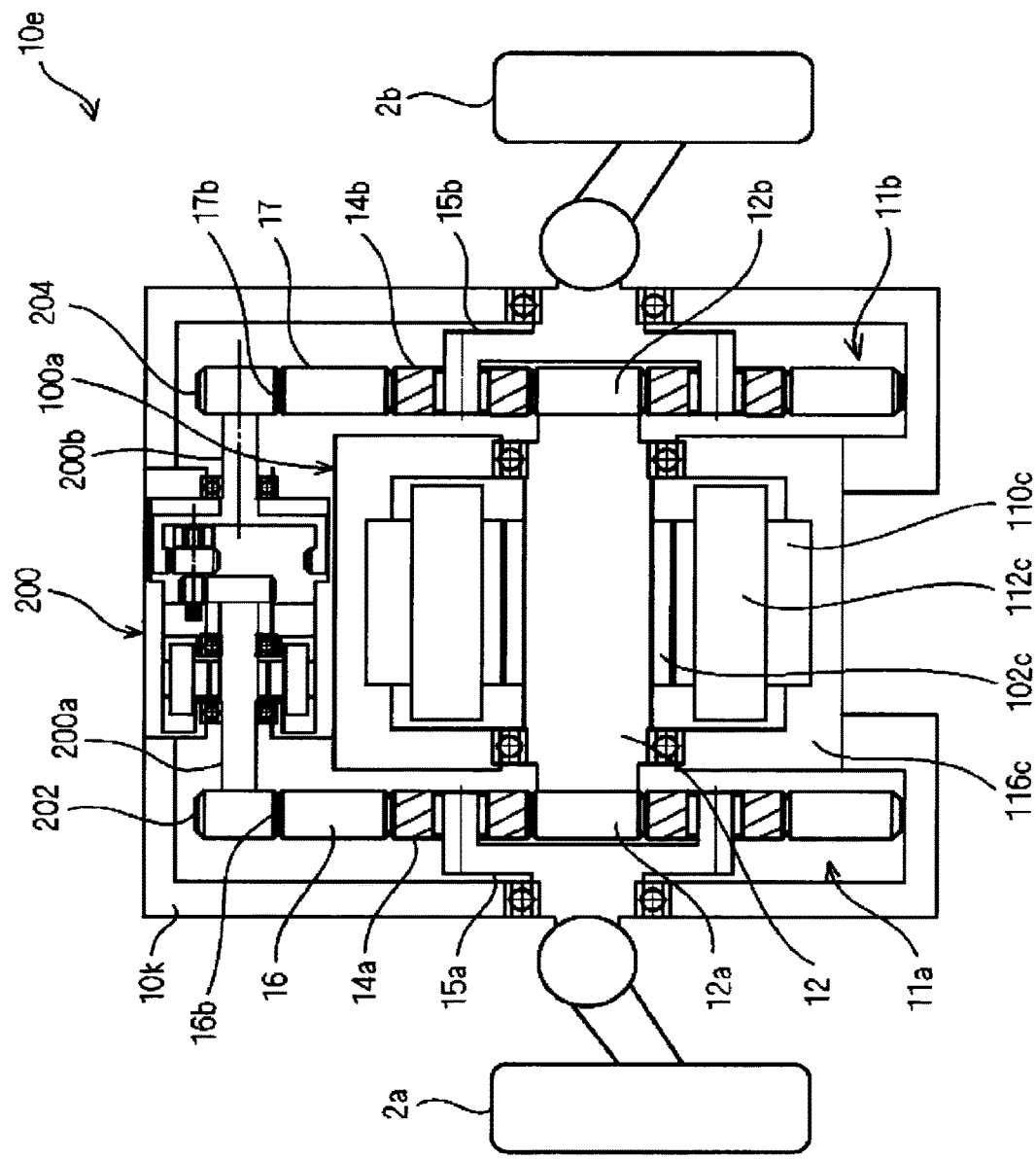
FIG. 16 is a configuration diagram of a main section of a drive gear unit (Sixth Embodiment).

FIG. 16 is a configuration diagram of a main section of the drive gear unit 10e. As illustrated in FIG. 16, the drive gear unit 10e is arranged such that the drive motor 100a that drives the connection shaft 12 to rotate and the reversing motor 200 serving as the control motor are arranged side by side in the radial direction, which is different from the drive gear unit 10d of the fifth embodiment.

The reversing motor 200 has first and second output shafts which are arranged coaxially, protrude to sides opposite to each other, and are driven to rotate in reverse directions. First and second gears 202 and 204 are fixed coaxially to output shafts 200a and 200b of the reversing motor 200. The outer teeth 16b and 17b to be engaged with the first and second gears 202 and 204 are formed in the internal gears 16 and 17 of the first and second pinion gear units 11a and 11b.

Figure 17:
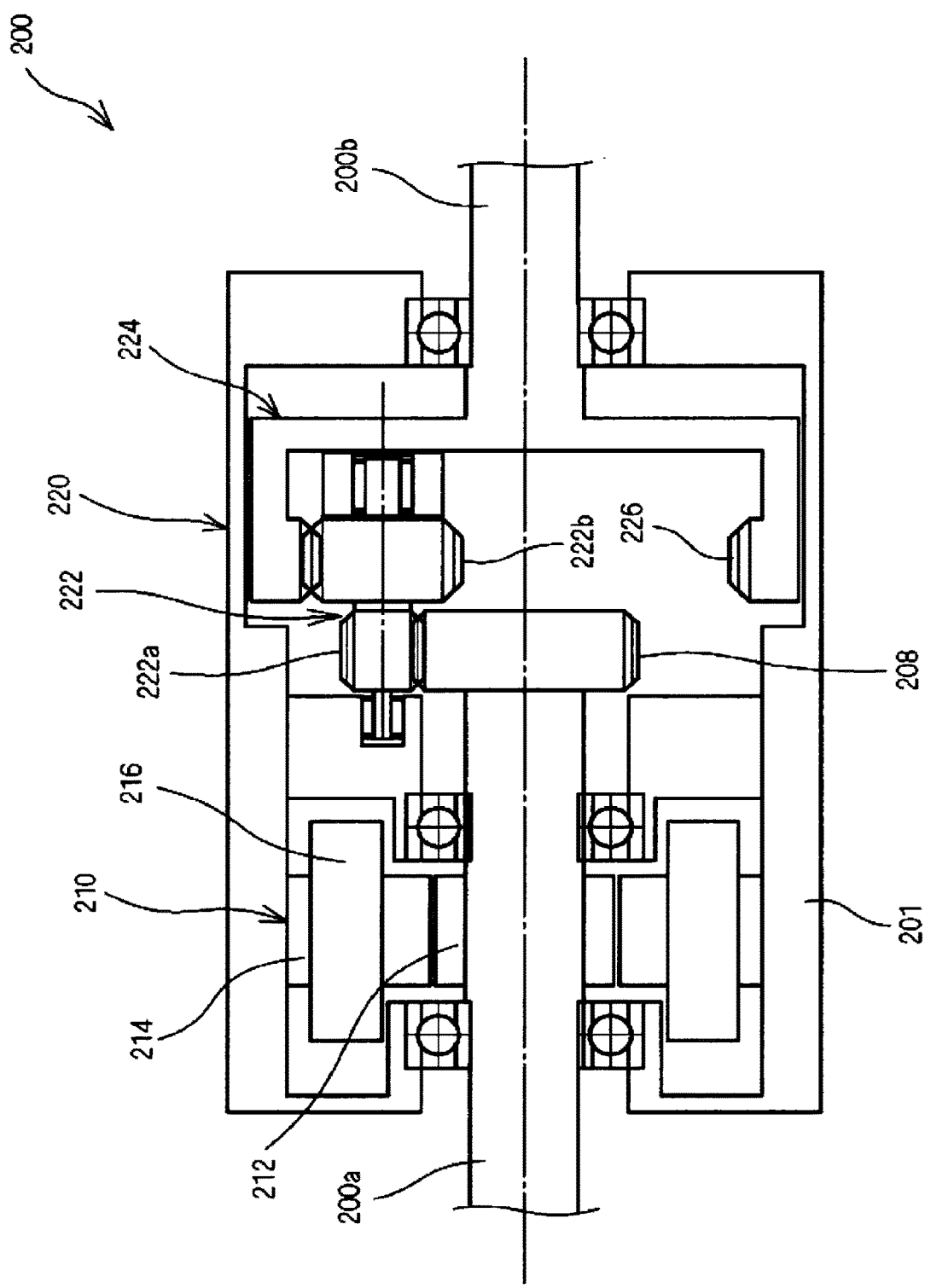
FIG. 17 is a configuration diagram of a biaxial motor unit (Sixth Embodiment).

FIG. 17 is an explanatory diagram illustrating a configuration of the reversing motor 200. As illustrated in FIG. 17, the reversing motor 200 has a motor 210 and a gear unit 220 being arranged coaxially inside a housing 201.

In the motor 210, the output shaft 200a serving as the inner rotor is arranged inside a stator 214 fixed to the housing 201, a magnet 212 is fixed to the output shaft 200a, and a coil 216 is provided in the stator 214. The output shaft 200a is rotatably supported by the housing 201, and has one end portion thereof protruding from the housing 201 and the other end portion to which a gear 208 is fixed.

The gear unit 220 includes a gear member 222 and a rotary member 224. The gear member 222 is rotatably supported by the housing 201, and has gears 222a and 222b at both ends thereof. The rotary member 224 is rotatably supported by the housing 201, and inner teeth 226 are formed at one end portion thereof, and the output shaft 200b are formed coaxially at the other end portions side. The gear 222a, one of the gear members 222, is engaged with the gear 208 fixed to the output shaft 200a, and the other gear 222b is engaged with the inner teeth 226 of the rotary member 224.

The reversing motor 200 preferably has the output shafts 200a and 200b rotating at the same rotational speed in the reverse directions in terms of easy design, but can be used even when the output shafts 200a and 200b have different rotational speed.

When the reversing motor 200 rotates, the internal gears 16 and 17 of the first and second pinion gear units 11a and 11b rotate in the reverse directions. The reversing motor 200 functions as the reverse rotation member and the control motor. Since the reversing motor 200 is unitized, it is easy to assemble.

The drive gear unit 10e can control the driving force by the drive motor 100a, and control the torque distribution by the reversing motor 200.

<Seventh Embodiment> A drive gear unit 10f of a seventh embodiment will be described with reference to FIG. 18.

Figure 18:
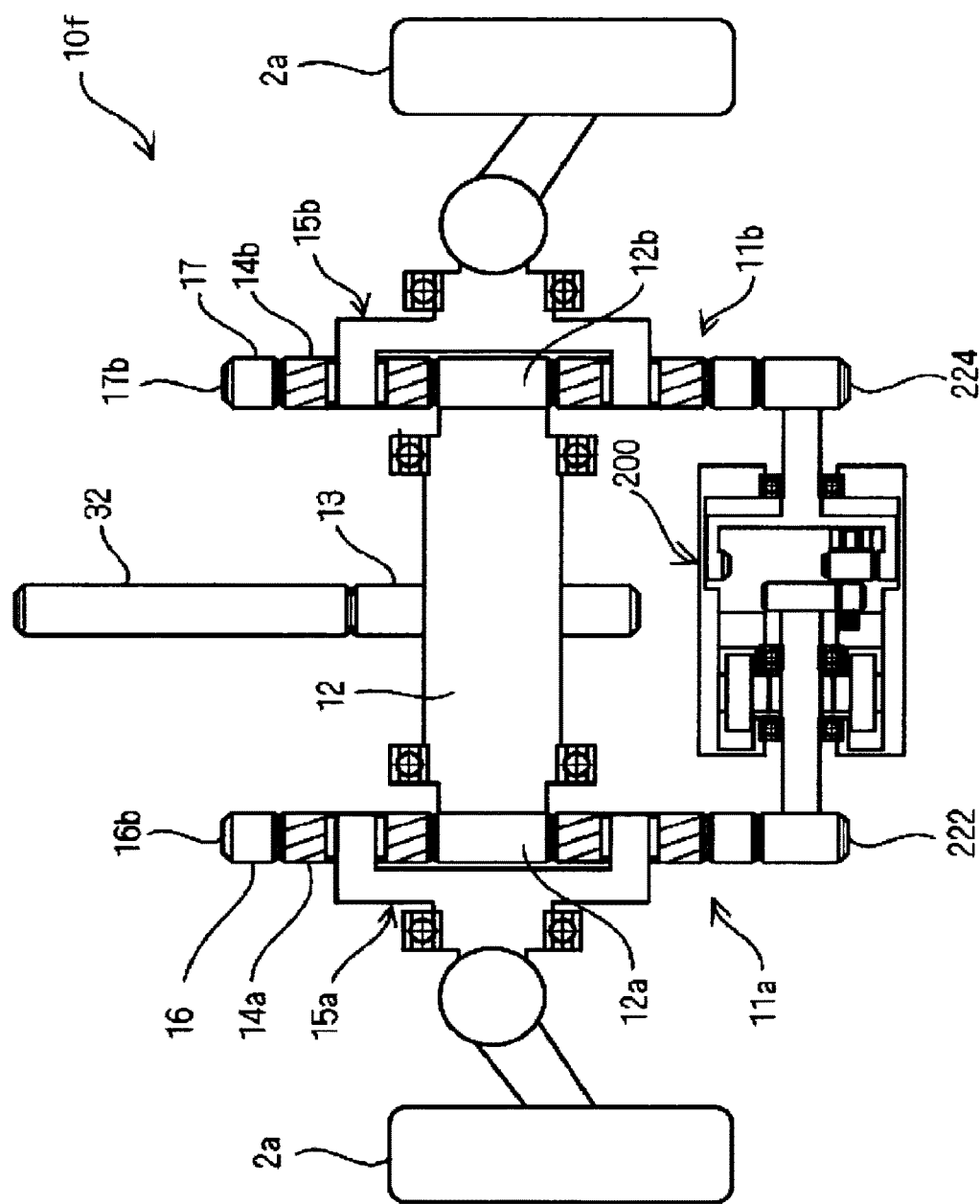
FIG. 18 is a configuration diagram of a main section of a drive gear unit (Seventh Embodiment).

FIG. 18 is a configuration diagram of a main section of the drive gear unit 10f. As illustrated in FIG. 18, the intermediate gear 13 is fixed to the connection shaft 12 in the drive gear unit 10f instead of the drive motor 100a of the drive gear unit 10d of the sixth embodiment. The intermediate gear 13 is engaged with the transmission gear 32, and rotation of, for example, an internal combustion engine or the motor is input via the transmission gear 32.

<Eighth Embodiment> A drive gear unit 10g of an eighth embodiment will be described with reference to FIG. 19.

Figure 19:
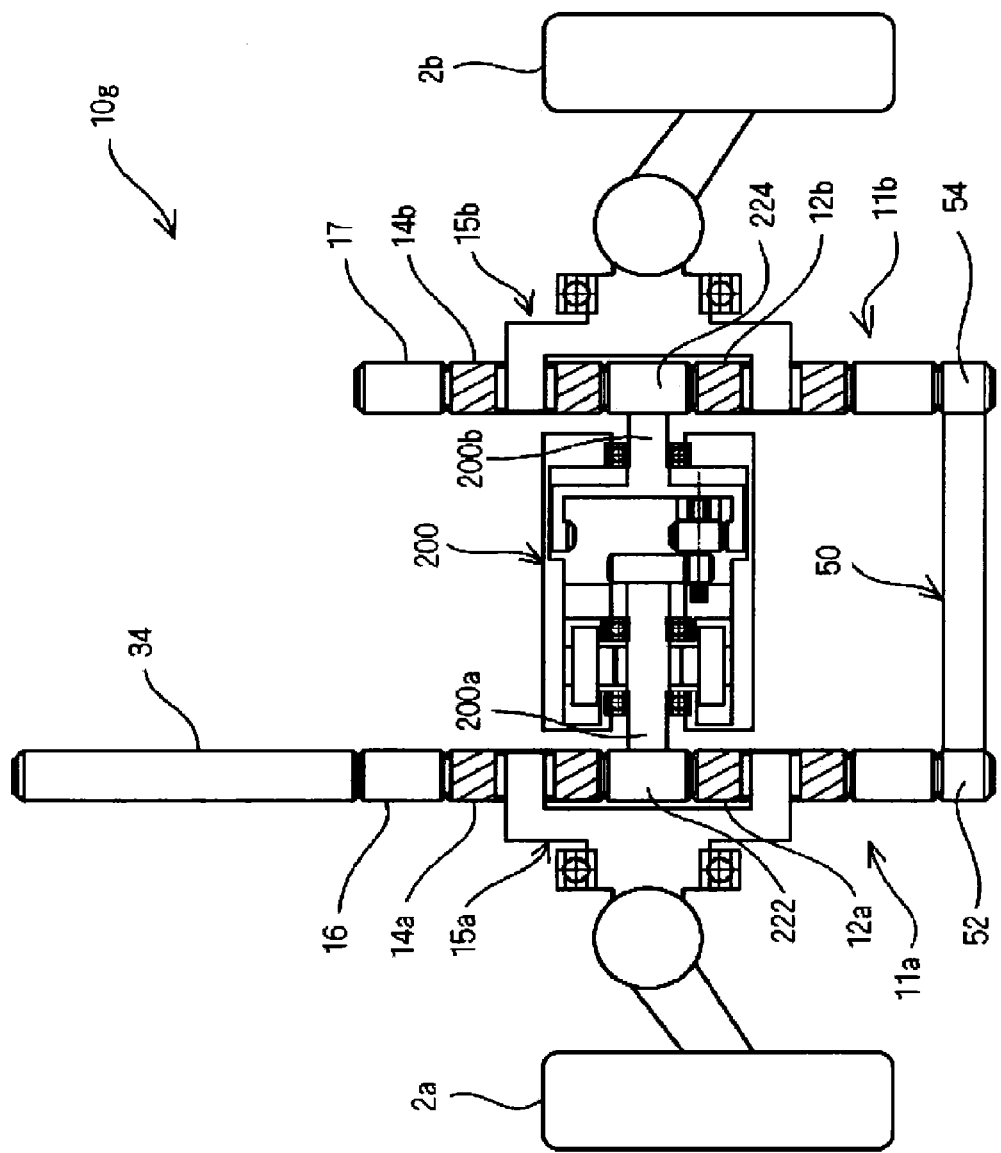
FIG. 19 is a configuration diagram of a main section of a drive gear unit (Eighth Embodiment).

FIG. 19 is a configuration diagram of a main section of the drive gear unit 10g. As illustrated in FIG. 19, the drive gear unit 10g uses the reversing motor 200 instead of the connection shaft 12 of the first to seventh embodiments. In other words, the sun gears as external gears 12a and 12b of the first and second pinion gear units 11a and 11b are connected coaxially to the first and second output shafts 200a and 200b of the reversing motor 200.

The internal gears 16 and 17 of the first and second pinion gear units 11a and 11b are connected so as to rotate at the same rotational speed in the same direction. In other words, the outer teeth 16b and 17b are formed in the internal gears 16 and 17 of the first and second pinion gear units 11a and 11b, and gears 52 and 54 formed at both sides of a gear member 50 are engaged with the outer teeth 16b and 17b. The gear member 50 is rotatably supported by a casing (not illustrated) of the drive gear unit 10g via a bearing (not illustrated). The gear member 50 is the connection member.

A transmission gear 34 is engaged with the outer teeth 16b of the internal gear 16 of the first pinion gear unit 11a. When the rotation of the internal combustion engine or the motor is input to the internal gear 16 of the first pinion gear unit 11a via the transmission gear 34, the internal gears 16 and 17 of the first and second pinion gear units 11a and 11b rotate at the same rotational speed in the same direction.

At this time, the sun gears as external gears 12a and 12b of the first and second pinion gear units 11a and 11b rotate in reverse directions in a case in which the reversing motor 200 is not driven, and thus, the torque is evenly distributed to the first pinion gear unit 11a side and the second pinion gear unit 11b side. In a case in which the reversing motor 200 is driven, and the sun gear as external gear 12a of the first pinion gear unit 11a and the sun gear as external gears 12b of the second pinion gear unit 11b rotate in the reverse directions, the distribution of the rotational torque into the first pinion gear unit 11a side and the second pinion gear unit 11b side is changed depending on such rotation in the reverse direction. Accordingly, it is possible to control the torque distribution by the reversing motor 200.

Figure 20:
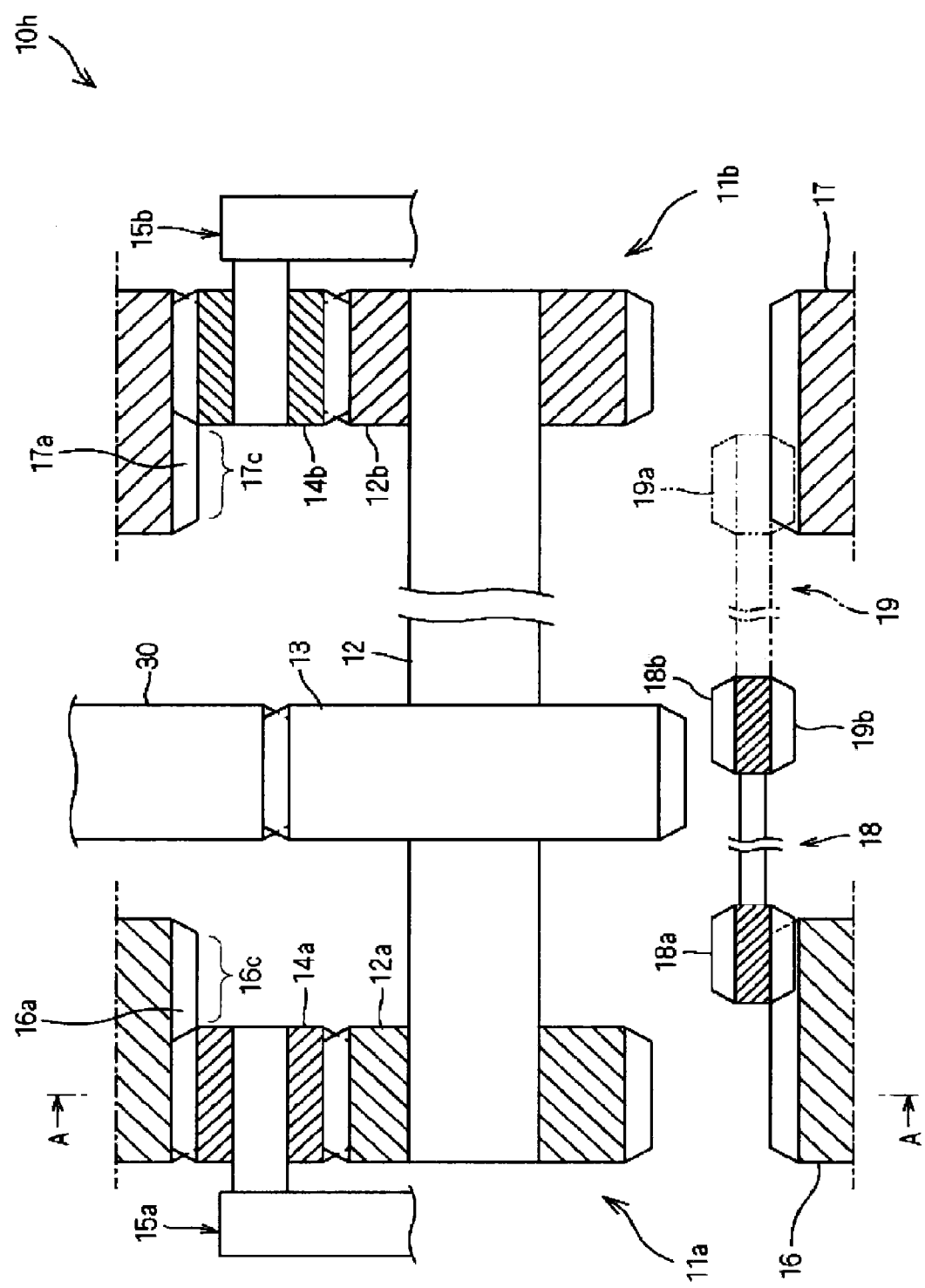
FIG. 20 is a configuration diagram of a main section of a drive gear unit (Ninth Embodiment).
Figure 21:
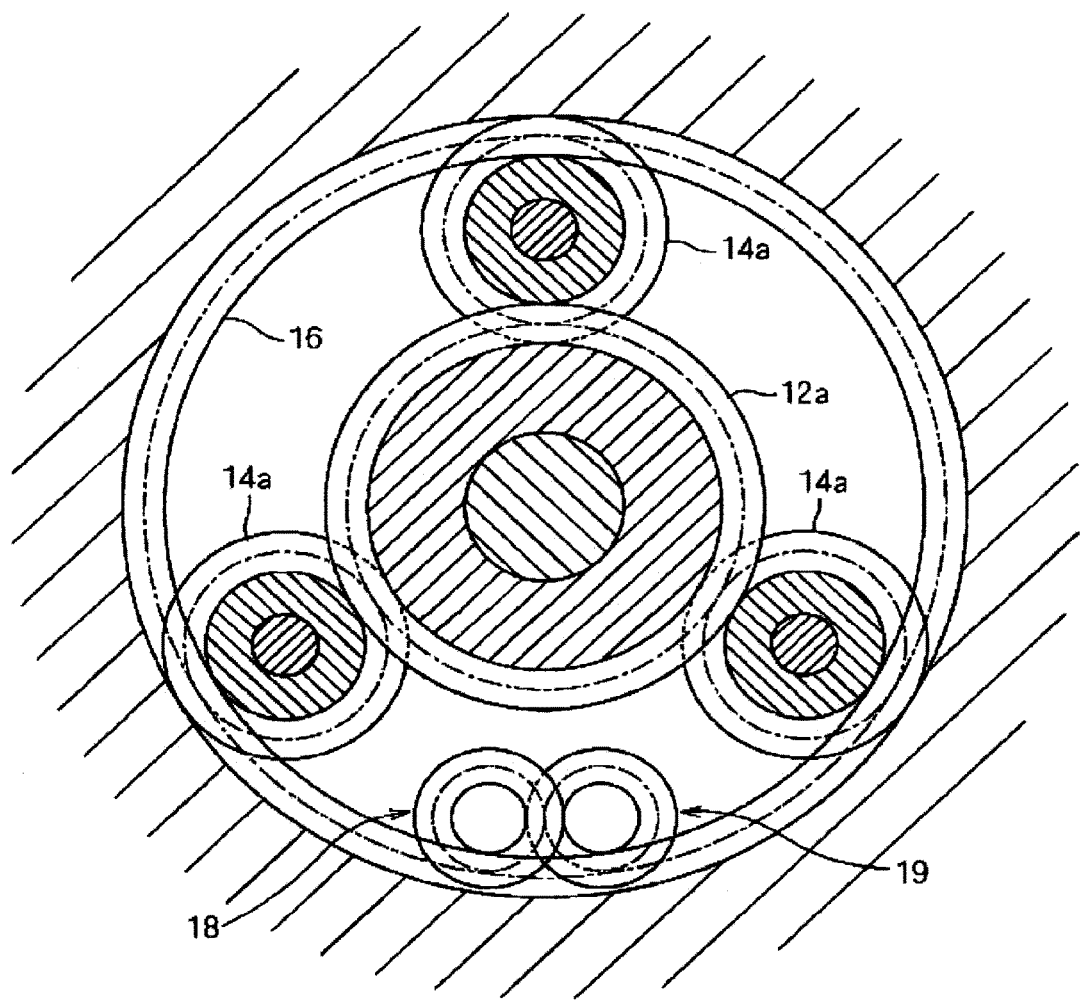
FIG. 21 is a cross-sectional view of the drive gear unit (Ninth Embodiment).

<Ninth Embodiment> A drive gear unit 10h of a ninth embodiment will be described with reference to FIGS. 20 and 21. FIG. 20 is a configuration diagram of a main section of the drive gear unit 10h. FIG. 21 is a cross-sectional view taken along line A-A of FIG. 20.

As illustrated in FIGS. 20 and 21, the drive gear unit 10h of the ninth embodiment is configured in substantially the same manner as the drive gear unit 10 of the first embodiment. In other words, similar to the drive gear unit 10 of the first embodiment, the drive gear unit 10h includes the first and second pinion gear units 11a and 11b, the connection shaft 12, the first and second auxiliary gear pairs 18 and 19, and the intermediate gear 13 fixed to the connection shaft 12.

As different from the first embodiment, the inner teeth 16a and 17a of the internal gears 16 and 17 of the first and second pinion gear units 11a and 11b include inner teeth extension portions 16c and 17c which are extended to sides opposite to each other.

The first and second auxiliary gear pairs 18 and 19 are arranged inwardly from the inner teeth 16a and 16b of the internal gears 16 and 17 of the first and second pinion gear units 11a and 11b, the first gear 18a of the first auxiliary gear pair 18 is engaged with the inner teeth extension portions 16c of the internal gear 16 of the first pinion gear unit 11a, a second gear 18b of the first auxiliary gear pair 18 and a third gear 19b of the second auxiliary gear pair 19 are engaged with each other, and a fourth gear 19a of the second auxiliary gear pair 19 is engaged with an inner teeth extension portion 17c of the internal gear 17 of the second pinion gear unit 11b.

The first and second auxiliary gear pairs 18 and 19 is arranged between the pinion gears 14a and 14b of the first and second pinion gear units 11a and 11b so as not to interfere with the pinion gears 14a and 14b of the first and second pinion gear units 11a and 11b and the intermediate gear 13.

The first and second auxiliary gear pairs 18 and 19 is rotatably supported by a housing (not illustrated) of the drive gear unit 10h, and a position of the rotation center axis of the first and second auxiliary gear pairs 18 and 19 is fixed with respect to the housing (not illustrated) of the drive gear unit 10h.

The internal gears 16 and 17 of the first and second pinion gear units 11a and 11b are connected by the first and second auxiliary gear pairs 18 and 19 so as to rotate in the reverse directions, and thus, can evenly distribute the rotational torque input to the intermediate gear 13 into the first pinion gear unit 11a side and the second pinion gear unit 11b side.

Incidentally, it is configured such that at least any one of the internal gear 16 of the first pinion gear unit 11a, the internal gear 17 of the second pinion gear unit 11b, the first auxiliary gear pair 18 and the second auxiliary gear pair 19 is rotated by the control motor in the case of controlling the torque distribution.

Figure 22:
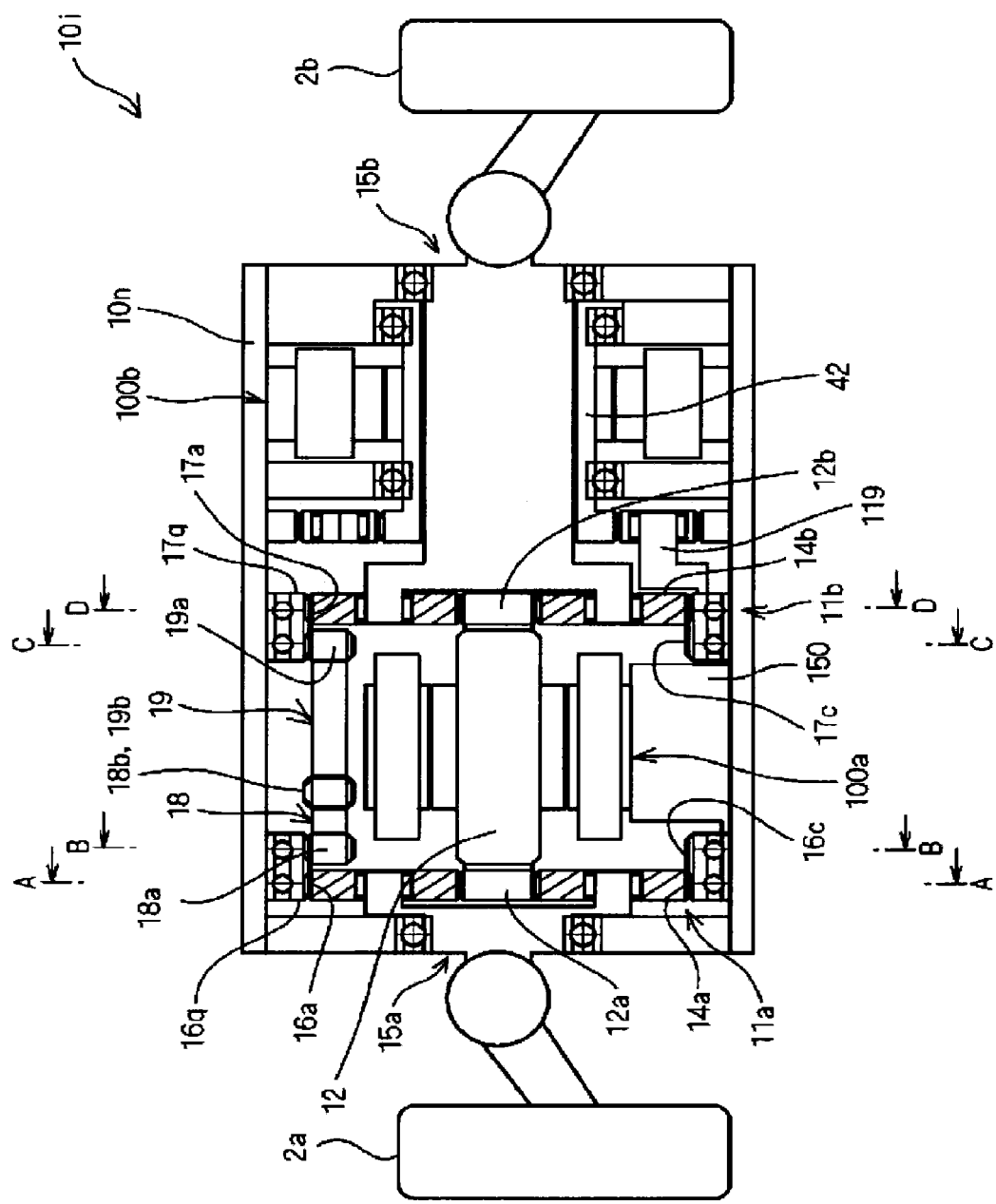
FIG. 22 is a configuration diagram of a main section of a drive gear unit (Tenth Embodiment).
Figure 23:
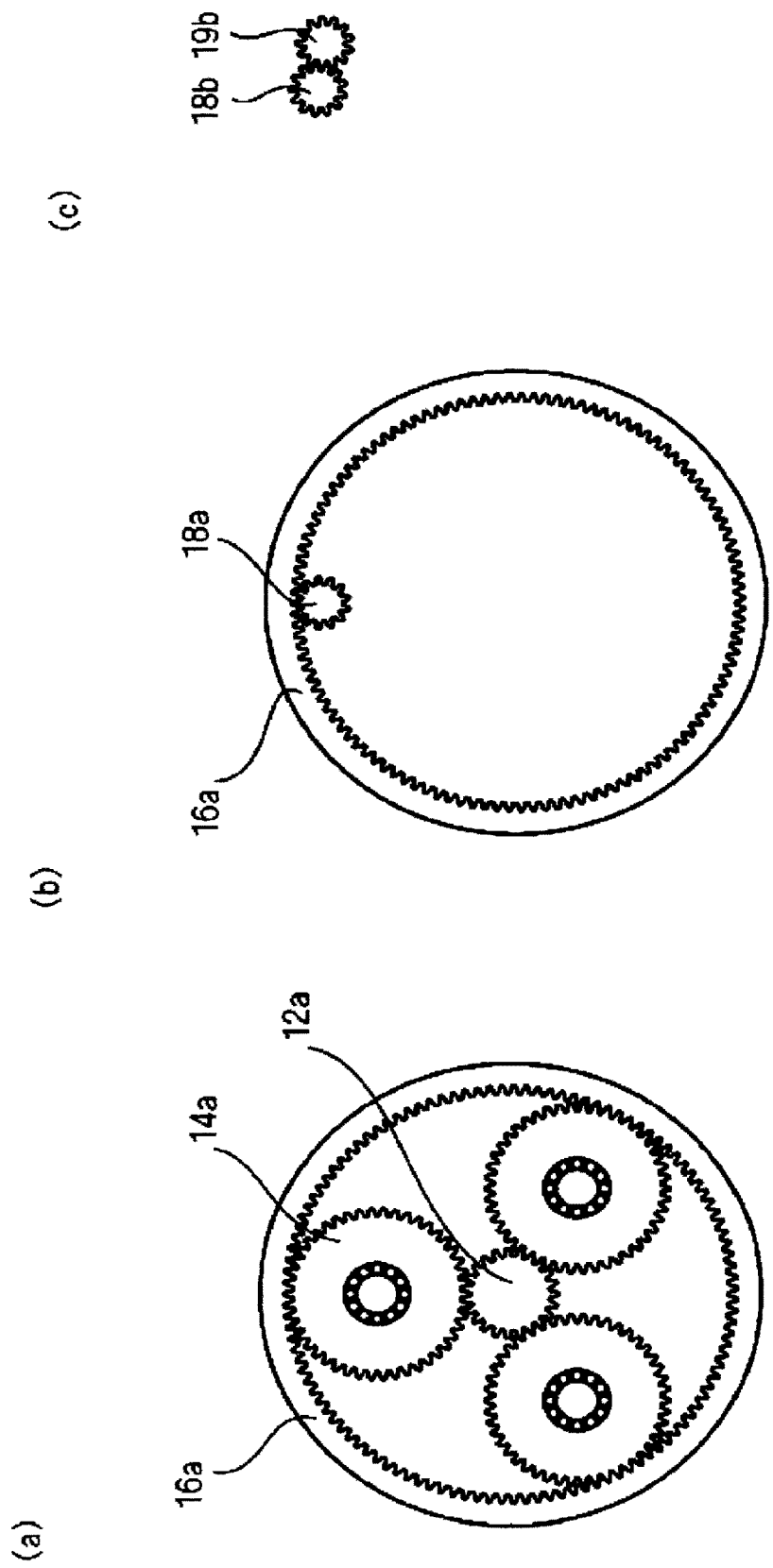
FIGS. 23(a) to 23(c) are cross-sectional views of the drive gear unit (Tenth Embodiment).
Figure 24:
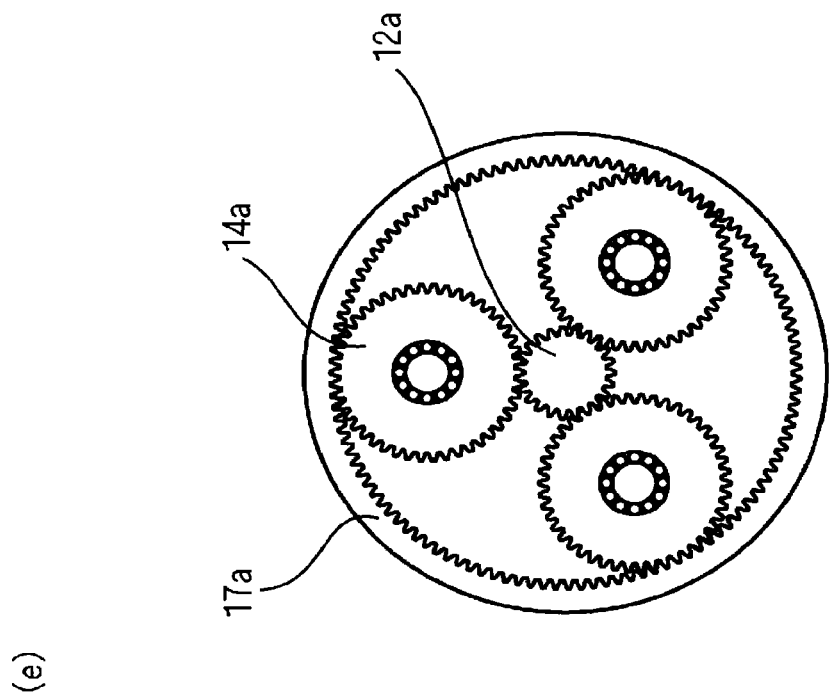
FIGS. 24(d) and 24(e) are cross-sectional views of the drive gear unit (Tenth Embodiment).
Figure 24:
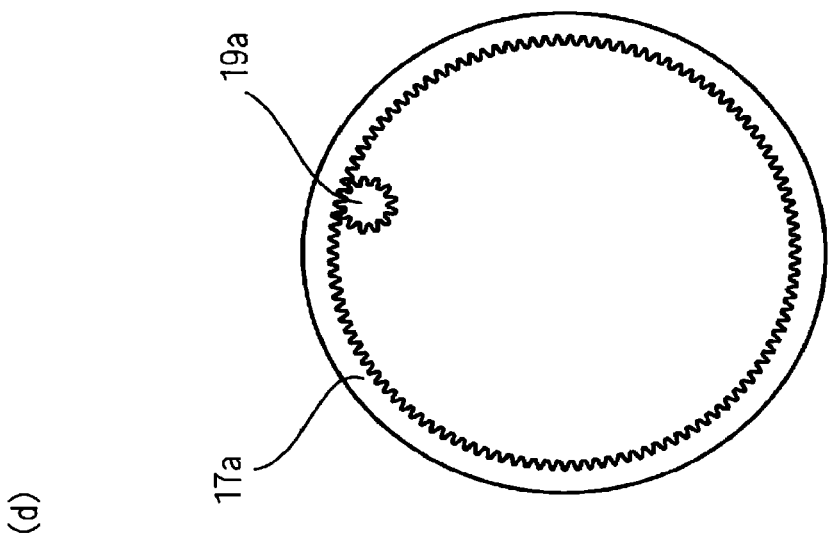
Figure 25:
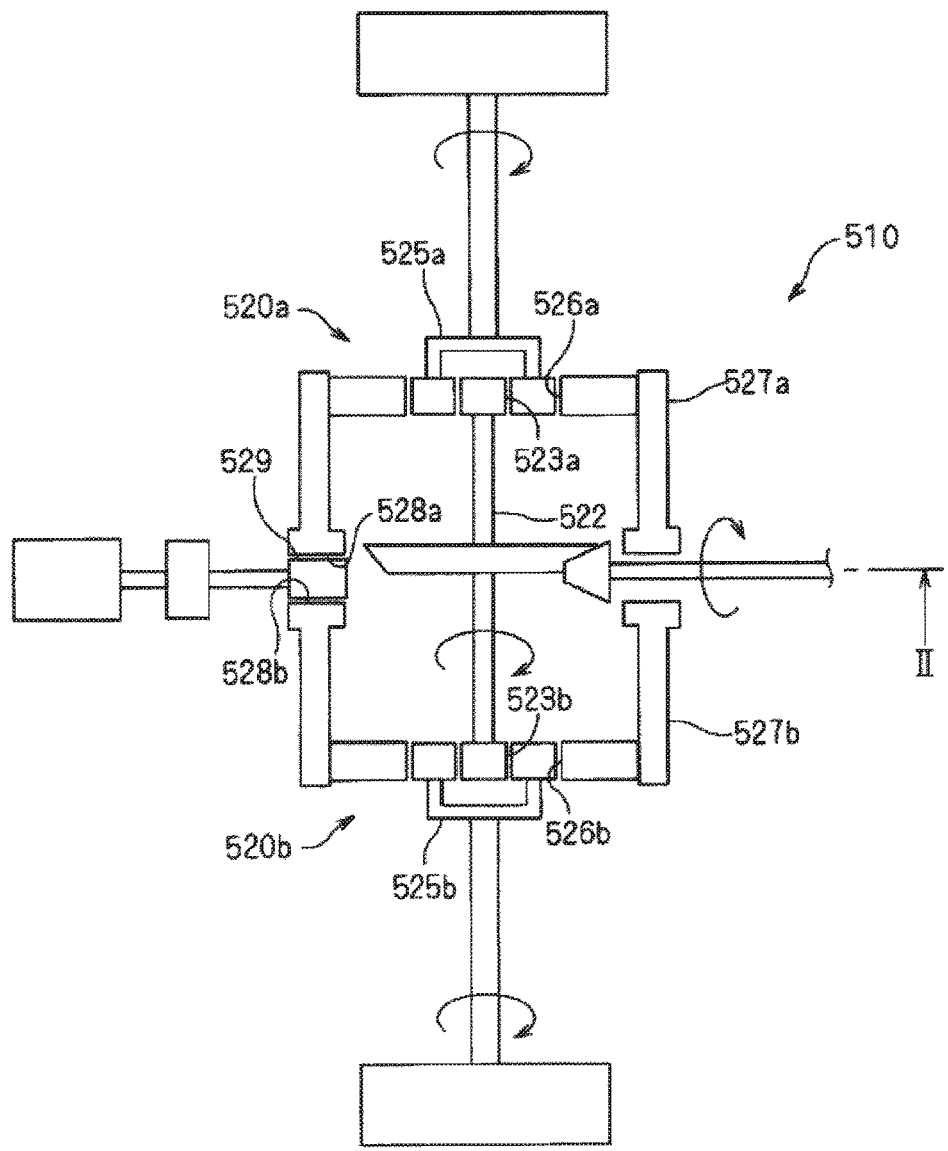
FIG. 25 is a configuration diagram of a differential gear unit (Conventional Example 1).
Figure 26:
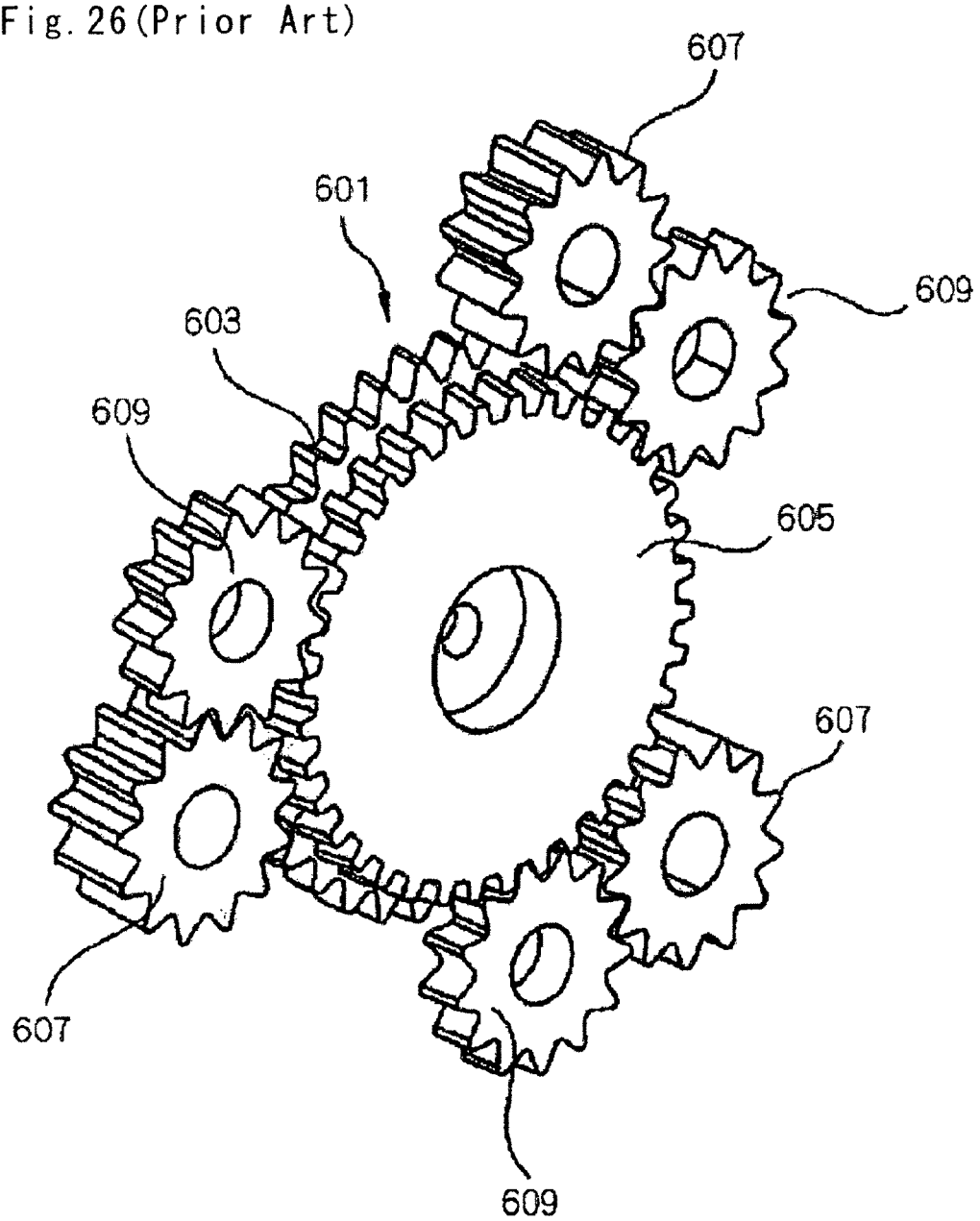
FIG. 26 is a perspective view of a spur gear differential unit (Conventional Example 2).
Figure 27:
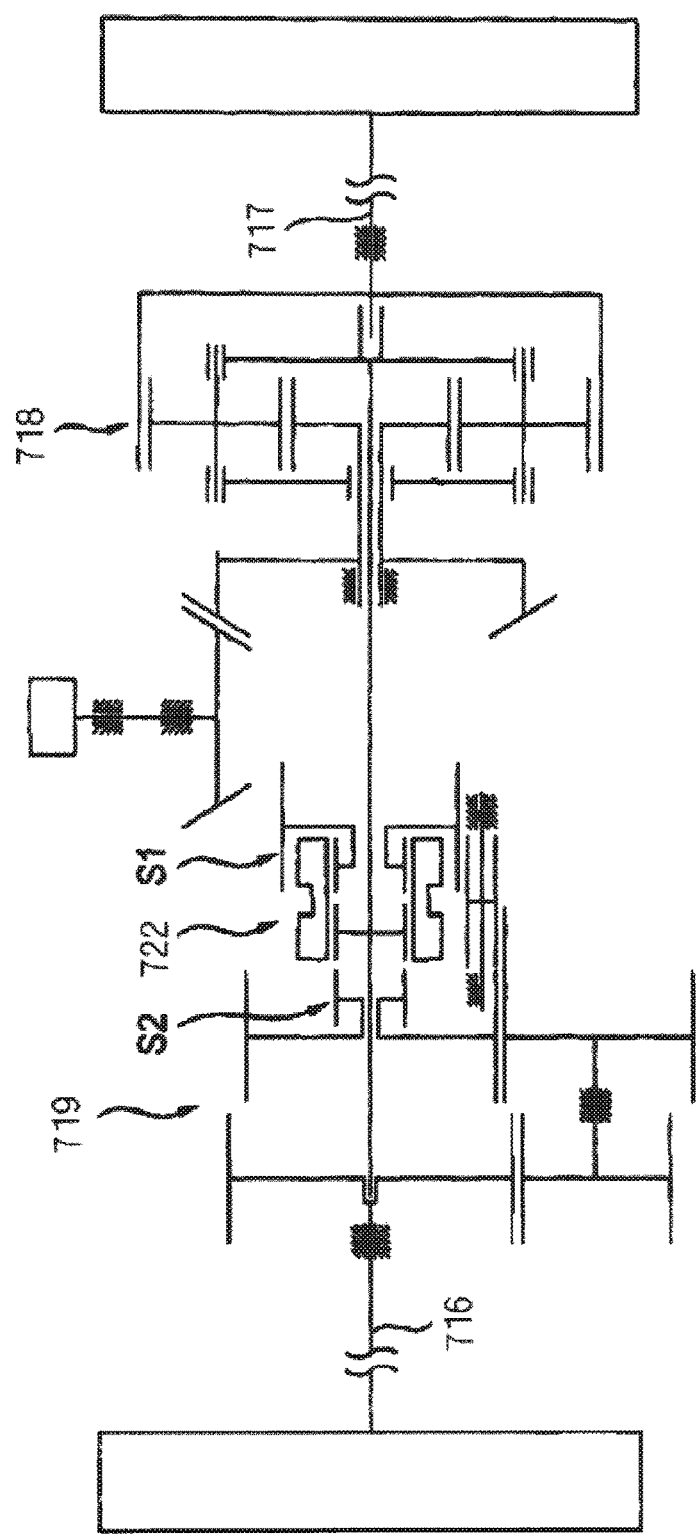
FIG. 27 is a configuration diagram of a transmission unit (Conventional Example 3).

<Tenth Embodiment> A drive gear unit 10i of a tenth embodiment will be described with reference to FIGS. 22 to 24(e). FIG. 22 is a configuration diagram of a main section of the drive gear unit 10i. FIG. 23(a) is a cross-sectional view taken along line A-A of FIG. 22. FIG. 23(b) is a cross-sectional view taken along line B-B of FIG. 22. FIG. 23(c) is a cross-sectional view taken along line C-C of FIG. 22. FIG. 24(d) is a cross-sectional view taken along line D-D of FIG. 22. FIG. 24(e) is a cross-sectional view taken along line E-E of FIG. 22.

As illustrated in FIGS. 22 to 24(e), the drive gear unit 10i is arranged such that the drive motor 100a that drives the connection shaft 12 to rotate and the control motor 100b that drives the internal gear 17 of the second pinion gear unit 11b to rotate are arranged side by side in the axial direction.

Internal gears 16q and 17q of the first and second pinion gear units 11a and 11b are rotatably supported by the housing 10n of the drive gear unit 10i via a bearing, and are rotated in reverse directions by the first and second auxiliary gear pairs 18 and 19. The inner teeth 16a and 17a of the internal gears 16q and 17q of the first and second pinion gear units 11a and 11b include the inner teeth extension portions 16c and 17c which are extended to the sides opposite to each other. The first and second auxiliary gear pairs 18 and 19 is rotatably supported by the housing 10n of the drive gear unit 10i via a bearing (not illustrated), and gears 18a, 18b, 19a and 19b are formed at both ends thereof in the axial direction. The second gear 18b of the first auxiliary gear pair 18 and the third gear 18b of the second auxiliary gear pair 19 are engaged with each other, the first gear 18a of the first auxiliary gear pair 18 is engaged with the inner teeth extension portion 16c of the internal gear 16q of the first pinion gear unit 11a, and the fourth gear 19a of the second auxiliary gear pair 19 is engaged with inner teeth extension portion 17c of the internal gear 17 of the second pinion gear unit 11b.

An exemplary number of teeth of each gear is as follows.

The number of teeth of the sun gears as external gears 12a and 12b of the first and second pinion gear units 11a and 11b:23

The number of teeth of the pinion gears 14a and 14b of the first and second pinion gear units 11a and 11b:46

The number of teeth of the inner teeth 16a and 17a of internal gears 16 and 17 of the first and second pinion gear units 11a and 11b:115

The number of teeth of the first to fourth gears 18a, 18b, 19a and 19b of the first and second auxiliary gear pairs 18 and 19:13

In this case, it is possible to arrange three sets of the first and second auxiliary gear pairs 18 and 19, and set the number of each arrangement of the pinion gears 14a and 14b to be the same as three.

The rotation of the output shaft 42 of the control motor 100b is transmitted to the internal gear 17q of the second pinion gear unit 11b via the planetary shaft 119 fixed to the internal gear 17q of the second pinion gear unit 11b as similar to the fifth embodiment.

When the drive motor 100a rotates, a driving force (rotational torque) thereof is transmitted to the carriers 15a and 15b of the first and second pinion gear units 11a and 11b. At this time, when the control motor 100b is rotated, the torque distribution is changed. Since the drive gear unit 10i can control the driving by the drive motor 100a and control the differential by the control motor 100b, it is possible to perform the control of the driving force and the control of the torque distribution in an independent manner.

<Conlusion> As described above, the drive gear units 10 and 10a can be simply configured, easily reduced in the size and weight, and has the small frictional loss.

Incidentally, the present invention is not limited to the embodiments described above, but can be implemented by being added with various types of modifications.

For example, it may be configured such that the members illustrated in the embodiments are divided into a plurality of members to serve the same function.

REFERENCE SIGNS LIST 2a, 2b Wheel
4 Control Motor
4a Rotary Shaft
5 Control Gear
6 Electric Motor
8 Rotary Shaft (Connection Member)
10, 10a to 10i Drive Gear Unit
10k, 10m, 10n Housing
11a First Pinion gear Unit
11b Second Pinion gear Unit
12 Connection Shaft (Connection Member)
12a and 12b Sun Gear as External Gear
13 Intermediate Gear
14a, 14b pinion gear
15a, 15b Carrier
15p, 15q Support Shaft
15s, 15t Central Shaft
16, 17 Internal Gear
16a, 17a Inner Teeth
16b, 17b Outer Teeth
16q, 17p, 17q Internal Gear
18 First Auxiliary Gear Pair
18a First Gear
18b Second Gear
19 Second Auxiliary Gear Pair
19a Second Gear
19b Fourth Gear
30, 30a, 30b Input gear
31, 31a, 31b Transmission gear
40 Fourth Auxiliary Gear Pair, Sixth Auxiliary Gear Pair
50 Gear Member (Connection Member)
100 Dual Concentric Motor
100a Drive Motor
100b Control Motor
121 Fifth Auxiliary Gear Pair
123 Third Auxiliary Gear Pair
200 Reversing Motor
200a, 200b Output Shaft

The invention claimed is:

1. A drive gear unit comprising:
a housing;
first and second pinion gear units each of which includes a sun gear as an external gear, a pinion gear meshed with the sun gear, an internal gear having inner teeth meshed with the pinion gear, and a carrier which supports the pinion gear while allowing to rotate and to revolve around the sun gear, and in which the sun gear, the internal gear and the carrier are allowed to rotate;

a connection member that provides a connection between either one pair of the sun gears or the internal gears of the first and second pinion gear units as a first pair in such a manner to rotate at same speeds and in same directions;

a reverse rotation member that provides a connection between the other pair of the sun gears or the internal gears of the first and second pinion gear units as a second pair in such a manner to rotate in different directions;

a dual concentric motor which includes an inner rotor arranged between the first pinion gear unit and the second pinion gear unit with both ends protruding to the first pinion gear unit side and the second pinion gear unit side and an outer rotor with both ends protruding the first pinion gear unit side and the second pinion gear unit side, and in which the sun gears of the first and second pinion gear units are connected coaxially at the both ends of the inner rotor and the second pinion gear unit side of the outer rotor is connected coaxially to the internal gear of the second pinion gear unit;

an auxiliary gear pair having inner teeth which is connected coaxially to the first pinion gear unit side of the outer rotor; and another auxiliary gear pair, which has coaxially formed first outer teeth to be engaged with outer teeth of the internal gear of the first pinion gear unit and second outer teeth to be engaged with the inner teeth of the auxiliary gear pair, and which is rotatably supported by the housing, wherein a torque inputted to the connection member is distributed to the first pinion gear unit and the second pinion gear unit, and outputted from the carrier, the inner rotor of the dual concentric motor functions as the connection member, and the outer rotor of the dual concentric motor, the auxiliary gear pair, and the another auxiliary gear pair function as the reverse rotation member.

2. The drive gear unit as claimed in claim 1, wherein the dual concentric motor functions as a control motor that rotates at least one of the internal gear of the first pinion gear unit, the internal gear of the second pinion gear unit, and the reverse rotation member, and the dual concentric motor functions as a drive motor that drives the connection member to rotate.

3. The drive gear unit as claimed in claim 1, further comprising:

an intermediate gear which is fixed to the connection member, and has outer teeth formed coaxially with the sun gears of the first and second pinion gear units, wherein the connection member is connected coaxially with the sun gears of the first and second pinion gear units as the first pair.

4. A drive gear unit comprising:

a housing;

first and second pinion gear units each of which includes a sun gear as an external gear, a pinion gear meshed with the sun gear, an internal gear having inner teeth meshed with the pinion gear, and a carrier which supports the pinion gear while allowing to rotate and to revolve around the sun gear, and in which the sun gear, the internal gear and the carrier are allowed to rotate;

a connection member that provides a connection between either one pair of the sun gears or the internal gears of the first and second pinion gear units as a first pair in such a manner to rotate at same speeds and in same directions;

a reverse rotation member that provides a connection between the other pair of the sun gears or the internal gears of the first and second pinion gear units as a second pair in such a manner to rotate in different directions;

a first auxiliary gear pair, which has coaxially formed a first gear and a second gear to be engaged with an inner teeth extension portion of the internal gear of the first pinion gear unit that is extended to the second pinion gear unit side, and which is rotatably supported by the housing; and a second auxiliary gear pair, which has coaxially formed a third gear to be engaged with the second gear of the first auxiliary gear pair and a fourth gear to be engaged with an inner teeth extension portion of the internal gear of the second pinion gear unit that is extended to the first pinion gear unit side, and which is rotatably supported by the housing, wherein a torque inputted to the connection member is distributed to the first pinion gear unit and the second pinion gear unit, and outputted from the carrier, the connection member is connected coaxially with the sun gears of the first and second pinion gear units serving as the first pair, and the first and second auxiliary gear pairs function as the reverse rotation members.

5. A drive gear unit comprising:

a housing;

first and second pinion gear units each of which includes a sun gear as an external gear, a pinion gear meshed with the sun gear, an internal gear having inner teeth meshed with the pinion gear, and a carrier which supports the pinion gear while allowing to rotate and to revolve around the sun gear, and in which the sun gear, the internal gear and the carrier are allowed to rotate;

a connection member that provides a connection between either one pair of the sun gears or the internal gears of the first and second pinion gear units as a first pair in such a manner to rotate at same speeds and in same directions;

a reverse rotation member that provides a connection between the other pair of the sun gears or the internal gears of the first and second pinion gear units as a second pair in such a manner to rotate in different directions; and a reversing motor that has first and second output shafts, which are arranged between the first and second pinion gear units, protrude to sides opposite to each other coaxially and are driven to rotate in reverse directions, and in which the sun gears of the first and second pinion gear units are connected coaxially to the first and second output shafts, wherein a torque inputted to the connection member is distributed to the first pinion gear unit and the second pinion gear unit, and outputted from the carrier, the first pair is the internal gears of the first and second pinion gear units, and the reversing motor functions as the reverse rotation member and a control motor that rotates at least one of the internal gear of the first pinion gear unit, the internal gear of the second pinion gear unit, and the reverse rotation member.

* * * * *